US 11,946,870 B2

(12) United States Patent
McManus et al.

(10) Patent No.: US 11,946,870 B2
(45) Date of Patent: Apr. 2, 2024

(54) DISTRIBUTED LEDGER FOR PHYSICAL MATERIAL

(71) Applicant: MAT International Holdings, LLC, Harker Heights, TX (US)

(72) Inventors: Catherine E. McManus, Harker Heights, TX (US); James W. Dowe, III, Richland Springs, TX (US)

(73) Assignee: MAT International Holdings, LLC, Harker Heights, TX (US)

( * ) Notice: Subject to any disclaimer, the term of this patent is extended or adjusted under 35 U.S.C. 154(b) by 388 days.

(21) Appl. No.: 16/616,047

(22) PCT Filed: May 22, 2018

(86) PCT No.: PCT/US2018/033938
§ 371 (c)(1),
(2) Date: Nov. 22, 2019

(87) PCT Pub. No.: WO2018/217788
PCT Pub. Date: Nov. 29, 2018

(65) Prior Publication Data
US 2020/0118117 A1 Apr. 16, 2020

Related U.S. Application Data

(60) Provisional application No. 62/510,078, filed on May 23, 2017.

(51) Int. Cl.
*G01N 21/65* (2006.01)
*G01J 3/443* (2006.01)
(Continued)

(52) U.S. Cl.
CPC .............. *G01N 21/65* (2013.01); *G01J 3/443* (2013.01); *G01N 21/00* (2013.01); *G01N 21/25* (2013.01);
(Continued)

(58) Field of Classification Search
CPC ........ G01N 21/65; G01N 21/00; G01N 21/25; G01N 21/62; G01N 23/06; G01N 21/718;
(Continued)

(56) References Cited

U.S. PATENT DOCUMENTS 8,699,022 B2   4/2014   McManus et al.
9,063,085 B2   6/2015   McManus et al.
(Continued)

FOREIGN PATENT DOCUMENTS

JP       2015/506484      3/2015    ............. G01N 21/63
WO     WO 2016/164496   10/2016    ............. G06Q 50/00

OTHER PUBLICATIONS

Applicant EPO correspondence Feb. 24, 2022 (Year: 2022).*
(Continued)

*Primary Examiner* — John W Hayes
*Assistant Examiner* — Edgar R. Martinez-Hernandez
(74) *Attorney, Agent, or Firm* — Fish & Richardson P.C.

(57) ABSTRACT

Methods, systems, and apparatus for distributed ledger for physical material. In one aspect, a method includes obtaining a first set of information regarding a physical material to be verified, the first set of information including hundreds of values for channels of a spectrum of electromagnetic radiation emitted by the physical material in response to an irradiation of the physical material; obtaining a second set of information regarding the physical material to be verified; sending the first and second sets of information over the communication network to a verification computer system; receiving verification information; initiating addition of information usable to identify the first set of information and the digital signature to a distributed digital ledger; receiving confirmation of the addition of the information useable to identify the first set of information and the digital signature
(Continued)

to the distributed digital ledger; and reporting that the physical material has been verified.

47 Claims, 6 Drawing Sheets

(51) Int. Cl.
| | |
|---|---|
| *G01N 21/00* | (2006.01) |
| *G01N 21/25* | (2006.01) |
| *G01N 21/62* | (2006.01) |
| *G01N 21/71* | (2006.01) |
| *G01N 23/06* | (2018.01) |
| *G06Q 10/087* | (2023.01) |
| *G06Q 20/36* | (2012.01) |
| *G06Q 20/38* | (2012.01) |
| *G06Q 20/40* | (2012.01) |
| *H04L 9/06* | (2006.01) |
| *H04L 9/32* | (2006.01) |

(52) U.S. Cl.
CPC ............ *G01N 21/62* (2013.01); *G01N 23/06* (2013.01); *G06Q 10/087* (2013.01); *G06Q 20/3674* (2013.01); *G06Q 20/401* (2013.01); *H04L 9/0643* (2013.01); *H04L 9/3239* (2013.01); *H04L 9/3247* (2013.01); *G01N 21/718* (2013.01); *G06Q 20/3825* (2013.01)

(58) Field of Classification Search
CPC ... G01J 3/443; G06Q 10/087; G06Q 20/3674; G06Q 20/401; G06Q 20/3825; H04L 9/0643; H04L 9/3239; H04L 9/3247
See application file for complete search history.

(56) References Cited

U.S. PATENT DOCUMENTS

| | | | |
|---|---|---|---|
| 9,641,338 B2 | 5/2017 | Sriram et al. | |
| 10,685,323 B2* | 6/2020 | Fuller | G06K 7/12 |
| 11,188,977 B2* | 11/2021 | Youb | G06Q 30/02 |
| 11,258,582 B2* | 2/2022 | Ramachandran | H04L 9/0869 |
| 2007/0158417 A1 | 7/2007 | Brewington | |
| 2010/0220835 A1* | 9/2010 | Gibson | G01V 5/0016 378/53 |
| 2013/0204531 A1* | 8/2013 | McManus | G01N 21/63 702/2 |
| 2014/0268133 A1* | 9/2014 | McManus | G01J 3/28 356/316 |
| 2016/0098723 A1 | 4/2016 | Feeney | |
| 2016/0283920 A1 | 9/2016 | Fisher et al. | |
| 2016/0300234 A1* | 10/2016 | Moss-Pultz | G06F 21/10 |
| 2017/0243193 A1* | 8/2017 | Manian | G06Q 20/3829 |
| 2018/0224334 A1* | 8/2018 | O'Rourke | G01N 21/274 |
| 2018/0276597 A1* | 9/2018 | Fuller | G06K 7/12 |
| 2019/0147397 A1* | 5/2019 | Hodges | G06Q 10/08 705/333 |

OTHER PUBLICATIONS

Application EP18805383 EPO Search Report (Year: 2022).*
Valencia Aggregate, Threshold, Multisig and Multisignatures by Ramsès Fernandez-Valencia (Year: 2022).*
Yaga, NIST.IR.8202 Blockchain Technology Overview (Year: 2018).*
Poulin, 14205745-REM_Sep. 18, 2017 p. 12 (Year: 2014).*
2.1.5_ Spectrophotometry—Chemistry Libre Texts (Year: 2022).*
J.H. Yu *, M. Simmonds , M.J. Baldwin , R.P. Doerner, Deuterium desorption from tungsten using laser heating (Year: 2016).*
Gabriel Taubin, BrownIntroducción a la Fotografia (Year: 2013).*
Biobase (Year: 2022).*
Incandescent and Halogen Lamps, https://www.youtube.com/watch?v=1VOoSxh3-m4 (Year: 2022).*
Distributor OceanOptics pro ČR a SK (Year: 2022).*
Liu, Calibration of the Relative Orientation between Multiple Depth Cameras Based on a Three-Dimensional Target (Year: 2019).*
Wang, Comparing deuterium retention in tungsten films measured by temperature programmed desorption and nuclear reaction analysis (Year: 2013).*
Menezes, HandBook of Applied Cryptography (Year: 1965).*
McManus, C. E. (Nov. 1 to 4, 2015). 2015 GSA Annual Meeting (Nov. 1-4, 2015) (vol. 47, p. 762). Baltimore; The Geological Society of America (GSA). (Year: 2015).*
McManus, C. E. (Nov. 1 to 4, 2015). 2015 GSA Annual Meeting T131. (Year: 2015).*
Nancy McMillan, New Mexico State University, Laser-Induced Breakdown Spectroscopy (LIBS) (Year: 2023).*
The Supplementary European Search Report for European Application No. EP 18 80 5383 dated Feb. 24, 2020.
Strajnar, "The 5 Pillars and 3 Layers to enterprise blockchain solution design", https://bravenewcoin.com/insights/the-5-pillars-and-3-layers-to-enterprise-blockchain-solution-design, dated Mar. 29, 2016.
"Blockchain (database)", *Wikipedia*, downloaded on Feb. 28, 2017, https://en.wikipedia.org/wiki/Blockchain, 16 pages.
"From shore to plate: Tracking tuna on the blockchain", *Provenance*, downloaded on Feb. 8, 2017, https://www.provenance.org/tracking-tuna-on-the-blockchain, 27 pages.
"Technology", *Provenance*, downloaded on Feb. 8, 2017, https://www.provenance.org/technology, 5 pages.
"Welcome to the digital vault of the future.", *Everledger*, downloaded on Feb. 8, 2017, https://www.everledger.io/, 8 pages.
Alt et al., "Defining Property in the Digital Environment", *Bitmark*, dated Nov. 29, 2016.
Blanco et al., "NIR spectroscopy: a rapid-response analytical tool", *TrAC Trends in Analytical Chemistry*, vol. 21, Issue 4, pp. 240-250 (Apr. 2002).
Cadman, "Aussie Bank's 7000-Mile Blockchain Experiment Could Change Trade", *Bloomberg*, dated Oct. 23, 2016, https://www.bloomberg.com/news/articles/2016-10-23/cotton-bales-7-0, 6 pages.
Hackett, "Walmart and IBM Are Partnering to Put Chinese Pork on a Blockchain", *Fortune 500*, dated Oct. 19, 2016, https://fortune.com/2016/10/19/walmart-IBM-blockchain-china-pork/, 14 pages.
International Preliminary Report on Patentability for International Application No. PCT/US2018/033938 dated Dec. 5, 2019.
International Search Report and Written Opinion of the International Searching Authority for International Application No. PCT/US2018/033938 dated Aug. 10, 2018.
Norton, "CIO Explainer: What Is Blockchain?", *The Wall Street Journal*, dated Feb. 2, 2016, https://blogs.wsj.com/cio/2016/02/02/cio-explainer-what-is-blockchain/, 7 pages.
Vigna, "A Closer Look at R3's Concord", *The Wall Street Journal*, dated Aug. 24, 2016, https://blogs.wsj.com/moneybeat/2016/08/24/a-closer-look-at-r3s-concord/, 3 pages.
Vigna, "Bitcoin-Tech Firm Thinks This Name Can Unify Wall Street Behind Blockchain", *The Wall Street Journal*, dated Aug. 24, 2016, https://www.wsj.com/articles/bitcoin-tech-firm-thinks-this-name-can-uni, 3 pages.
Hahn et al., "Laser-Induced Breakdown Spectroscopy (LIBS), Part II: Review of Instrumental and Methodological Approaches to Material Analysis and Applications to Different Fields," Applied Spectroscopy, Apr. 2012, 66(4): 347-419.
Rauschenbach et al., "Laser induced breakdown spectroscopy on soils and rocks: Influence of the sample temperature, moisture and roughness," Spectrochimica Acta, Part B, Oct. 2008, 63(10): 1205-1215.
Tognoni et al., "Signal and noise in Laser Induced Breakdown Spectroscopy: An introductory review," Optics & Laser Technology, May 2016, 79, 164-172.
The Notification of Non-Compliance with Substantive Requirements and Invitation to Submit Observations and/or Amended Application and Search Report issued by the African Regional Intellectual Property Organization for Application No. AP/P/2019/012088, dated Jun. 10, 2022.

(56) References Cited

OTHER PUBLICATIONS

The Notice of Reasons for Refusal issued by the Japanese Patent Office for Application No. JP 2019-565318, dated May 10, 2022 (with English Translation).
[No Author Listed], "Deuterium Tungsten-Halogen Calibration Light Source DH-2000-CAL," Ocean Optics Inc., May 2, 2017, retrieved from URL<https://web.archive.org/web/20170502151439/https://www.usna.edu/Users/physics/vanhoy/_files/SP425/LabDocs/Ocean%20Optics%202000/SpectraSuite/070131_1347%20R/documentation/Light%20Sources/dh2000cal.pdf>, 30 pages.
Case, "Spectrometers: Spectroscopic calibration uses LEDs and nonlinear optimization," Laser Focus World, Feb. 1, 2016, retrieved from URL<https://www.laserfocusworld.com/test-measurement/spectroscopy/article/16546930/spectrometers-spectroscopic-calibration-uses-leds-and-nonlinear-optimization>, 12 pages.
Extended European Search Report in European Appln No. 23193542.0, dated Dec. 21, 2023, 14 pages.

* cited by examiner

DISTRIBUTED LEDGER FOR PHYSICAL MATERIAL

CROSS-REFERENCE TO RELATED APPLICATIONS

This patent application is a 371 U.S. National Phase application of PCT/US2018/033938, filed on May 22, 2018, which claims the benefit of U.S. Provisional Patent Application No. 62/510,078, filed May 23, 2017, which is incorporated by reference herein.

BACKGROUND

This specification relates to ledgers for physical materials. A conventional ledger depends on a trusted central administrator to verify each transaction request and commit the transaction to the ledger. The trusted central administrator is responsible for the accuracy and availability of the ledger. Examples of such centralized ledgers are credit card, checking, saving, and investment account ledgers. Examples of trusted central administrators are banks and clearing houses. The presence of a mutually trusted administrator allows two parties that do not trust each other to perform remote transactions. When the central administrator becomes inoperative, however, the entire set of ledgers under the central administrator's control becomes inaccessible and prevents transactions from taking place. Additionally, when the central administrator is compromised and the ledger is destroyed or altered, there may not be a way to recover or detect modifications to the ledger.

A distributed ledger is a consensus of replicated, shared, and synchronized digital data spread across multiple nodes without a central administrator or centralized data storage. Copies of distributed ledger are replicated and shared among the nodes of a distributed ledger network. Replication and sharing give the distributed ledger its characteristic resiliency and protection against unauthorized alteration.

SUMMARY

This specification describes technologies relating to distributed ledgers for physical material.

In general, one or more aspects of the subject matter described in this specification can be embodied in one or more methods that include obtaining, at a computer coupled with a communication network, a first set of information regarding a physical material to be verified, the first set of information including hundreds of discrete data units representing physical characteristics of the physical material to be verified; obtaining, at the computer coupled with the communication network, a second set of information regarding the physical material to be verified; sending, by the computer, the first and second sets of information over the communication network to a verification computer system; receiving, at the computer, verification information from the verification computer system, the verification information including a digital signature by the verification computer system of at least information usable to identify the first set of information; initiating, by the computer, addition of the information usable to identify the first set of information and the digital signature to a distributed digital ledger; receiving, by the computer, confirmation of the addition of the information usable to identify the first set of information and the digital signature to the distributed digital ledger; and reporting, by the computer, that the physical material has been verified responsive to receipt of the confirmation. Other embodiments of this aspect include corresponding systems, apparatus, and computer program products.

In some embodiments, the hundreds of discrete data units can include different types of data that represents the physical characteristics of the physical material to be verified. For example, the hundreds of discrete data units in the first set of information can include hundreds of values for base pairs of deoxyribonucleic acid (DNA) obtained from the physical material. As another example, the hundreds of discrete data units in the first set of information can include hundreds of values for channels of a spectrum of electromagnetic radiation emitted by the physical material in response to an irradiation of the physical material. These and other types of data can be used in various embodiments, either alone or in combination with each other. Moreover, the hundreds of discrete data units can be tens, hundreds, or even thousands of hundreds of discrete data units in various implementations.

These and other embodiments can optionally include one or more of the following features. In some embodiments, the information usable to identify the first set of information can be the first set of information. In some embodiments, the hundreds of values for channels of the spectrum of electromagnetic radiation can include at least two hundred channels of data from the spectrum of electromagnetic radiation. In some embodiments, the hundreds of values for channels of the spectrum of electromagnetic radiation can be indicative of isotopic emissions, molecular emissions, molecular structure, molecular isotopic emissions, spectral interference between atomic emissions from different atoms in the physical material, or a combination thereof.

In some embodiments, the computer can be a part of an analysis system, and the digital signature can be a first digital signature. In some embodiments, obtaining the first set of information can include irradiating the physical material, receiving the spectrum of electromagnetic radiation responsive to the irradiating, and generating the hundreds of values from the received spectrum of electromagnetic radiation. In some embodiments, obtaining the second set of information can include retrieving from the distributed digital ledger (a) previously produced hundreds of values for channels of the spectrum of electromagnetic radiation emitted by the physical material in response to a previous irradiation of the physical material and (b) a second digital signature of at least the previously produced hundreds of values, and verifying the second digital signature using a public key portion of an asynchronous encryption key pair used by the verification computer system. In some embodiments, sending the first and second sets of information can include sending the generated hundreds of values and the previously produced hundreds of values to the verification computer system.

In some embodiments, the method can also include verifying the first digital signature using the public key portion of the asynchronous encryption key pair used by the verification computer system; checking that one or more conditions of a transfer are met in addition to the verification of the first digital signature; and initiating payment for the transfer responsive to the checking. In some embodiments, the method can also include identifying the one or more conditions of the transfer from a record in the distributed digital ledger associated with the second set of information. In some embodiments, initiating payment for the transfer can include initiating the addition to the distributed digital ledger.

In some embodiments, the distributed digital ledger can include a public distributed digital ledger and a private distributed digital ledger, the private distributed digital ledger including a first entry including the hundreds of values for channels of the spectrum of electromagnetic radiation; obtaining the second set of information regarding the physical material to be verified can include obtaining, from the public distributed digital ledger, the second set of information including a second pointer to a second entry of the private distributed digital ledger regarding the physical material to be verified; the digital signature of the information usable to identify the first set of information can include a digital signature of a first pointer to the first entry of the private distributed digital ledger; and initiating addition of the information usable to identify the first set of information and the digital signature to the distributed digital ledger can include initiating addition of the first pointer to the public distributed digital ledger.

In some embodiments, the distributed digital ledger can include a public portion and a private portion, the public portion including plain-text information and the private portion including encrypted information; and the first set of information can be stored in the private portion of the distributed digital ledger, and the digital signature can be stored in the public portion of the distributed digital ledger.

In some embodiments, the computer can be part of a tracking system, and the digital signature can be a first digital signature. In some embodiments, obtaining the first set of information can include receiving the hundreds of values. In some embodiments, obtaining the second set of information can include identifying a current set of criteria for the physical material at a current location in a supply chain. In some embodiments, sending the first and second sets of information can include sending the hundreds of values and the current set of criteria for the physical material at the current location in the supply chain.

In some embodiments, the method can also include verifying the first digital signature using a public key portion of an asynchronous encryption key pair used by the verification computer system; retrieving from the distributed digital ledger (a) previously produced hundreds of values for channels of the spectrum of electromagnetic radiation emitted by the physical material in response to a previous irradiation of the physical material at a previous location in the supply chain and (b) a second digital signature of at least the previously produced hundreds of values, the second digital signature having been created to verify the physical material at the previous location in the supply chain; verifying the second digital signature using the public key portion of the asynchronous encryption key pair used by the verification computer system; and initiating the addition to the distributed digital ledger only after verification of both the first digital signature and the second digital signature. In some embodiments, the physical material at the previous location in the supply chain can be an uncombined raw material, and the physical material at the current location in the supply chain can be combined with at least one other physical material.

In some embodiments, the information usable to identify the first set of information can be a first pointer to a first entry including the hundreds of values for channels of the spectrum of electromagnetic radiation. In some embodiments, a private material information database can include the first entry including the first set of information; obtaining the second set of information regarding the physical material to be verified can include obtaining, from the distributed digital ledger, the second set of information including a second pointer to a second entry of the private material information database regarding to the physical material to be verified; the digital signature of the information usable to identify the first set of information can include a digital signature of a first pointer to the first entry of the private material information database; and initiating addition of the information usable to identify the first set of information and the digital signature to the distributed digital ledger can include initiating addition of the first pointer to the distributed ledger. In some embodiments, the private material information database can be a private distributed digital ledger.

In some embodiments, the information usable to identify the first set of information can be a hash of the first set of information.

Various embodiments of the subject matter described in this specification can be implemented to realize one or more of the following advantages. In some embodiments, fraud and human error can be reduced in transactions of physical materials. In some embodiments, provenance of physical materials can be verified at the time of transaction. In some embodiments, processed materials that have undergone transformative processing can be tracked. In some embodiments, contracts involving transfer or transformation of physical materials can be more quickly executed.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
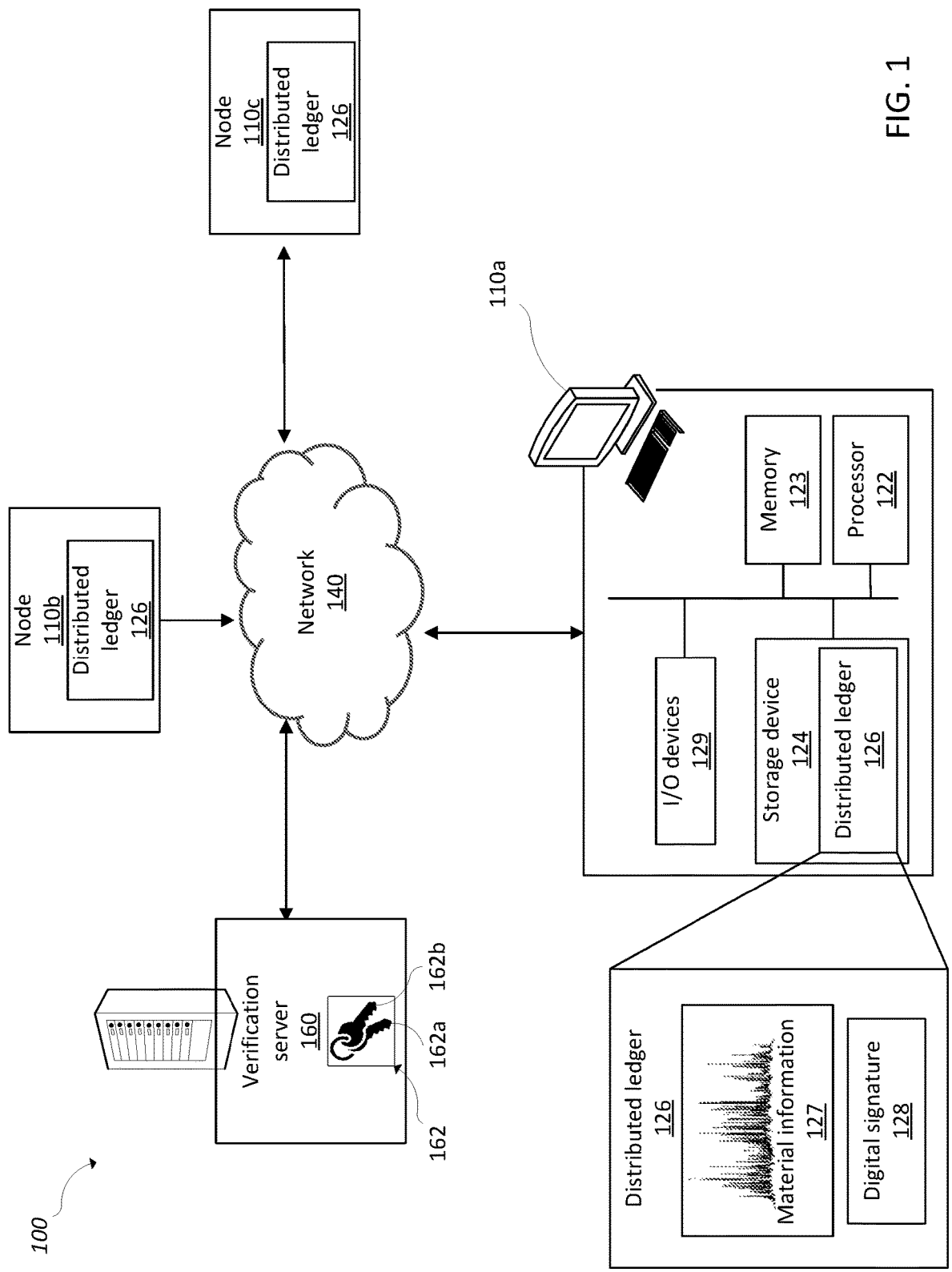
FIG. 1 shows an example of a distributed ledger system for physical materials.

FIG. 1 shows an example of a distributed ledger system 100 for physical materials. A distributed ledger node 110a includes a processor 122, a memory 123, a storage device 124, and one or more input/output (I/O) devices 129. The processor 122 can be one or more hardware processors, which can each include multiple processor cores. The memory 123 can include both volatile and non-volatile memory, such as Random Access Memory (RAM) and Flash RAM. The storage device 124 includes a distributed ledger 126, which contains one or more material information 127 and one or more digital signatures 128. The storage device 124 can include a hard disk, a solid state memory device, or a tape device. A computer readable medium can include storage device 124 and memory 123, which stores instructions that implement various distributed ledger and material verification operations that can be run on the processor 122. Examples of I/O devices 129 include a display, a camera, a speaker, a microphone, a tactile feedback device, a keyboard, a mouse, and a communication interface. The distributed ledger node 110a uses the I/O devices 129 to communicate with other computers. The distributed ledger node 110a can be connected to a network 140, which can be a private network, a public network, a virtual private network, etc. The network 140 can be connected to additional distributed ledger nodes 110b and 110c that each contain a copy of the distributed ledger 126. Nodes 110b and 110c can be implemented using the same computer technology described for 110a. The network 140 can also be connected to a verification server 160 to provide connectivity between verification server 160 and nodes 110a, 110b, and 110c. The verification server 160 includes an encryption key pair 162 containing a public key 162a and a private key 162b.

Distributed ledger 126 is a consensus of replicated, shared, and synchronized digital data spread across multiple nodes (e.g., nodes 110a, 110b, and 110c) without a central administrator or centralized data storage. Copies of distributed ledger 126 are replicated and shared among the nodes of a distributed ledger network. The distributed ledger can be updated whenever a transaction involving a physical material is completed. However, instead of the previous record being overwritten, the transaction information is exchanged between nodes (for example, between two distributed ledger nodes) and added as a new ledger entry through methods described in detail below.

Distributed ledger 126 contains digital ledger entries describing transactions for physical materials. Physical materials, however, do not have a native digital representation. Therefore, a digital representation, or a 'tag', of a physical material is typically created as a proxy for a physical material in the digital domain. Examples of conventional digital representations of physical materials include stock keeping units (SKUs) or serial numbers. However, a conventional digital representation is circumstantial information that infers the existence of the underlying physical material but does not prove the actual existence or identity of the physical material. This is because such digital representations are not bound to the physical materials and do not uniquely identify the material, such as a hash value does for a digital document. SKUs or serial numbers can be readily altered or forged, and this ease of alteration of the conventional digital representations of physical materials can enable creation of fraudulent distributed ledger entries.

Material information 127, which uniquely identifies a physical material and represents characteristics of the material that are inseparable from the material itself, without changing the nature of the material, is included in the entries of distributed ledger 126. Unlike a conventional digital representation, material information 127 inseparably binds a digital ledger entry to the underlying physical material. Every material, natural or man-made, bears traces of the materials and processes involved in its creation. Every sample of material, if examined in sufficient detail, is different from every other sample. Such differences that uniquely identify one material from all others can be used for determination of identity or provenance. An example of such difference is found in the spectrum of electromagnetic radiation emitted from a plasma created from the material itself. This difference is called a spectral signature of a material.

In general, human interventions in data acquisition, data entry, and data processing can leave a distributed ledger system vulnerable to human error and fraud, including falsification of material information 127. For example, a manual pairing of material information 127 with a physical material can leave the distributed ledger system vulnerable to potential mistakes in the pairing, or deliberate mispairing of material information 127 to a non-related physical material for fraudulent purposes. Therefore, in some implementations, human intervention is removed from steps for acquiring material information through committing that information to the distributed ledger.

Material information 127 can be used to determine the identity, quality, or provenance of a physical material. Identity, for example, can be determined from identifying the elemental composition of a material by collecting and analyzing the material's spectral signature, which can be decomposed to the spectral signatures of each constituent element. Quality of a material can depend on what kind of processing was performed on the material. For example, steel may be thermally processed to improve its strength, and different thermal processing gives the processed materials different spectral signatures. This information can be used to determine the quality of a material. Provenance determination is useful for a variety of reasons, such as determining the value of the material (e.g., a mineral), the geographical origin of a material, or whether a material (e.g., a manufactured material) has been made to its specifications. Provenance can also refer to a particular factory, process, or manufacturer in the case of man-made materials. In some cases, provenance of a material can be determined by combining the determination of identity and quality associated with a material's geographic origin or processing plant. In some cases, provenance determination of man-made materials allows for the identification of counterfeit products and/or substandard products.

Examples of material information 127 include spectral signatures or hundreds of values for channels of a spectrum of electromagnetic radiation emitted by the physical material in response to an irradiation of the physical material. A channel of a spectrum of electromagnetic radiation is understood to be a range or "window" of wavelengths about a center wavelength of the channel. Material information 127 may also include other information such as weight percent of chemical concentrations, bacteria, viruses, fungus, DNA, laser induced breakdown spectroscopy (LIBS) spectra, near infrared spectroscopy spectra, X-ray fluorescence spectra (XRF), Raman spectra, or other absorption or emission spectroscopic data. In some implementations, the material information 127 contained within the distributed ledger 126 can be a cryptographic hash of the complete material information data, such as hundreds of values for channels of a spectrum. The full data that uniquely identifies a material may be stored elsewhere (e.g., verification server 160) and retrieved using the hash value. In some implementations, the material information 127 contained within the distributed ledger 126 can be a pointer to a data entry that includes partial or complete material information 127. The data entry may be located outside of the distributed ledger 126. Examples of the pointer include a universal resource locator (URL), a network address, an index into a table of information (e.g., names, values) and an address of an entry on another distributed ledger. In some implementations, the material information 127 includes the full data that uniquely identifies the material.

Verification server 160 provides verification information and can store complete material information data. The verification server 160 can provide verification information in response to material information received in a verification query that arises from a digital ledger transaction for physical materials. The verification query can include verification of provenance, determining whether two sets of information correspond to the same physical material (identity), or whether a pre-determined physical or chemical transformation of a material has or has not taken place. Another example of the verification query is verification of a presence or an absence of a particular feature in the received material information. For example, a presence or an absence of nitrogen aggregation states or silicon vacancies in a diamond can lead to the presence of absence of a particular spectroscopic feature in the received material information, which may be indicative of quality or provenance of the diamond. In some implementations, one or more of the distributed ledger nodes 110a, 110b, and 110c may each serve as a verification server 160 to provide material information verification. In some implementations, the verification server 160 is owned by one party and provides verification services to one or more separate parties that deploy one or more respective distributed ledger systems 100. In some implementations, the verification server 160 is owned by, and under physical control of a party deploying the distributed ledger system 100 to provide, for example, additional data security.

Verification server 160 may verify the identity or provenance of a material through a variety of methods. An example of a verification method performed by the verification server 160 includes (a) compare the sequence of spectra for the sample to a sequence of spectra for each of multiple reference samples in a reference library and (b) determine whether the compared material information substantially matches one another. As part of the comparison process, cluster analysis techniques and algorithms such as those commercially available in MATLAB® toolboxes from MathWorks Inc. (Natick, MA) can be used to determine the constituent spectra in a sequence of spectra for provenance verification purposes. For example, the weighted K-nearest neighbor algorithm can be used to identify spectra that define a common constituent when the weighted K-nearest neighbor differences are small enough. In another example, the received material information can be compared with material information of multiple reference samples in a reference library to find a match and provide verification of a material's provenance. The reference library can be established for a geological material (e.g., a gemstone or a metal), by collecting reference samples from deposits all around the world. Such a library would enable verification of the origin of a material based on scanned material information. In some implementations, different reference libraries can be established for different regions of the world. For example, a country-specific reference library can be established, which can be used to verify whether or not a material originated from that particular country associated with the country-specific reference library. In some implementations, the country-specific reference library includes a sample of reference data from other countries for improved robustness.

In general, the reference library may be a public database, or a private database with access control. In some scenarios, it may be desirable to limit public access to the reference library. Material information entries of the reference samples can be used by the verification server 160 in various ways to verify identity or provenance of an unknown material. For example, a particular spectral feature of a mineral may be given extra weight by the verification method of the server 160 in determining whether a spectrum of an unknown mineral matches the reference spectrum. A fraudulent party with access to the reference material information may attempt to use the reference material information to create a counterfeit material that mimics the particular spectral feature of the reference material to get around the verification method. Further, in some cases, the reference material information may include proprietary information or trade secrets that a manufacturer or a supplier of the reference material may not wish to publicly disclose. For example, a spectrum of a proprietary steel may have spectral features indicative of a particular dopant or a particular thermal processing that the steel manufacturer considers to be its trade secret and therefor wishes to keep private. As such, the verification server 160 may limit access to the reference library. For example, the access to the entries of the reference library may be granted only to the verification server 160 and the respective owners of the reference material. In some implementations, the reference library is a private distributed digital ledger with access granted only to the verification server 160 and the parties that have contributed entries to the reference library.

To ensure a high degree of confidence in the place of origin of the geological material, it is desirable to document sufficient information about the material sample during collection, such as (1) the coordinates of the location (e.g., as determined from a satellite-based positioning system, e.g., the Global Positioning System (GPS) system), (2) the time and date of collection, (3) the name and affiliation of the collector, (4) whether the sample is extracted from weathered rock, (5) whether the sample is extracted directly from a host rock, (6) the zone/bed/pipe/vein from which the sample is extracted, (7) the type of host rock, (8) whether the sample is extracted from mine tailings, the floor of the mine, or a river, (9) a description of the physical sample (e.g., its color, size, inclusions, or host rock), and (10) whether the sample is collected with other samples. In some embodiments, it is desirable to collect a statistically significant number of samples (e.g., at least 30 samples) from a particular mine in a deposit. In some embodiments, if a deposit has multiple mines, it is desirable to collect a statistically significant number of samples (e.g., at least 30 samples) from each mine. In some embodiments, if a mine has multiple zones/beds containing the same geological material (e.g., a pegmatite, a placer, a pipe, a vein, a lava flow), it is desirable to collect a statistically significant number of samples (e.g., at least 30 samples) from each zone. After collection, all samples are assigned an internal tracking number that can be used to track the samples to the collection event. The documents describing the parameters of collection are preserved with the physical samples, and rigorous chain-of-custody procedures are followed to ensure continuing integrity of the reference collection. Properties of geological materials may change over time due to various reasons, such as due to changes in mining depths or locations over time, or due to change in the mining locations on a host rock of a diamond. As such, the reference collection may be updated or augmented with additional reference samples over time to track and account for potential changes in the properties of geological materials obtained from a particular source. Other verification methods include simple subtraction, partial least square—discriminant analysis (PLS-DA), principal component analysis (PCA), classification using a neural network, Bayesian analysis, or other statistical pattern recognition processes.

In general, the quantity of material information 127 needed for accurate verification depends on the nature of the verification task. Tasks requiring small distinctions to be made generally require finer spectral resolution and/or spectral range than tasks that do not involve small distinctions.

Typically, minerals originating from two locations that are far apart have easily distinguishable characteristics. Therefore, distinguishing provenance of a mineral between Afghanistan and Colombia can be performed with relatively few channels of a spectrum (e.g., 300 channels). As another example, distinguishing one composition of a metal alloy from a second composition of the metal alloy can require more channels of a spectrum (e.g., 40,000 channels), as two compositions of the metal alloy typically have similar overall spectral signatures with differences in fine spectral features. In general, the number of channels needed for a verification task is application-specific, and the number can be found empirically for a given application (e.g., in the range of 100 to 100,000 discrete data units, such as channels of electromagnetic spectrum).

Distributed ledger 126 may be implemented using a blockchain (hereafter called 'blockchain ledger'). A blockchain is a distributed database that maintains a continuously growing list of ordered records called blocks. A block holds batches of valid transactions that have taken place and been validated since the creation of the last block. Each block also contains a timestamp and a link to a previous block created using the cryptographic hash value of the previous block. Therefore, a 'chain' of blocks, which can be traced all the way to the original block, is formed. Any modification to any of the previous blocks would necessarily change the respective hash values, invalidating the chain. Accordingly, a valid chain of blocks contains the entire history of entries of a ledger.

A hash function is a one-way function that calculates a hash value of a set number of bits (e.g., 64 bits, 128 bits, 256 bits, 512 bits, or more) from an input message. The hash function has the following properties. It is deterministic so the same message always results in the same hash value. It is quick to compute the hash value for any given message. It is infeasible to generate a message from its hash value except by essentially trying all possible messages. A small change to a message changes the hash value so extensively that the new hash value appears uncorrelated with the old hash value. It is infeasible to find two different messages with the same hash value. Therefore, in effect, a hash value uniquely identifies any volume of digital information.

A blockchain ledger can be 'permissioned' or 'permission-less'. In permissioned blockchain systems, also known as private blockchains, blockchains may be owned, controlled, and managed by a central trusted party or a group of participants in the form of a consortium. Only trusted or vetted participants are allowed to participate in the control and maintenance of permissioned blockchains. Distributed identical copies of blockchains are kept by all participating nodes. The copies of blockchains may be visible only to the participating nodes. This controlled sharing of blockchains among registered or authorized nodes can be used to support an industry-level record system that keeps track of asset ownership, the movement of material across supply chains, the status of settlements, and other transactions. In permission-less blockchain systems, also known as public blockchains, the blockchain is controlled and maintained by any willing participant nodes. Any participating node may have full visibility of the blockchains. There is no assumption of trust among the participating nodes, and this lack of trust can create certain challenges in maintaining the integrity of the blockchain.

In some implementations, a permission control module is provided for controlling access to data and setting permission levels in a distributed ledger system. In general, different applications for the distributed ledger system have different needs for controlling access to data and ensuring protection of sensitive data. The permission control module can be used (e.g., by an administrator of a given application of the distributed ledger system) to delineate public data from private data. In some implementations, the permission control module can define which types of data are stored in the blockchain and which types of data are stored outside of the blockchain to limit dissemination, replication, and/or access to certain types of data, e.g., sensitive data, as well as whether additional encryption techniques are to be used with data located in the blockchain or outside of the blockchain. In some implementations, the blockchain can be set up by the permission control module to store a location or a pointer (e.g., network location, computer system path) of the sensitive data, which can be accessed by a separate access permission level or a separate set of credentials. Examples of sensitive data may include the reference library and the material information acquired as part of a verification process. In some implementations, the control module is used during the setup of a distributed ledger system to configure the system to store sensitive data outside of the blockchain. In some implementations, a distributed ledger has a public portion and a private portion, where the private portion is encrypted by the permission control module. Authorized parties may decrypt the content of the private portion through the permission control module.

A cryptographic proof can replace the need for a trusted third party in a blockchain. A cryptographic proof can be obtained in multiple different ways, including use of public-key cryptography. Public-key cryptography, a type of asymmetric cryptography, is a cryptographic system that uses a public-private pair of encryption keys. Public keys are disseminated widely, but private keys are held in secret by the respective owners. The encryption key pair 162 of the verification server 160 is an example of a public-private pair of encryption keys. To send a secure message to another person, one uses the recipient's public key to encrypt the message using a pre-determined algorithm. The encrypted message can then only be decrypted by the recipient in possession of the matching private key. This process can be used in reverse to produce a digital signature 128. In other words, a signee can use his or her private key to encrypt a 'signature' (e.g., signee's name), which can then be decrypted by the matching public key to recover the signature. Successful decryption using the public key proves that the signature was truly signed by the signee as asserted.

In the absence of a central controlling party, the process of updating the distributed ledger relies on a process for achieving a consensus among the nodes (or 'distributed consensus') regarding all new entries added to the blockchain. In some implementations, achieving distributed consensus requires two steps: validation of each transaction, and the broadcast of the validated result to all the other nodes handling the blockchain.

During the validation step, nodes individually determine whether or not new entries in a block are valid, as well as whether the block can be admitted to the blockchain. Specifically, the nodes perform validation of every transaction in the block to ensure that its contents are legitimate. For example, they verify that the sender of a transaction is the true owner of the asset being sold by verifying the sender's digital signature using public-key cryptography.

During the broadcast step, nodes reach a consistent view of the new entry in the blockchain. It begins when a node has validated one or more transactions and initiates the process of adding them to the blockchain. The validating node first broadcasts information about the new block to the other validating nodes. The other validating nodes may have also validated the same set or different sets of transactions, but the consensus process allows them to communicate among themselves and agree on a common set of validated transactions to be added to the blockchain.

An illustrative example of adding a transaction to a blockchain-based distributed ledger is given. An example of a transaction is transferring the ownership of a physical material from party A to party B. A node initiates the transaction by broadcasting a proposed transaction to the other nodes of the blockchain. The proposed transaction is signed by the private keys associated with party A and party B. The other nodes receive the proposed transaction and verify whether the transaction is properly authorized by party A using the digital signature process. The nodes further check their respective copy of the blockchain ledger to confirm that the physical material in party A's ledger matches the expectations for that material, in accordance with the material information 127, by verifying the digital signature 128 corresponding to the material information 127. The nodes also verify whether party B is accepting the transfer of ownership by verifying the digital signature of party B. When these verifications, or 'validation', is complete, the transaction is broadcasted to be recorded in the current block. If the nodes reach a consensus to record this transaction, the transaction becomes a part of the newly updated distributed ledger 126 reflecting the transfer of ownership.

The process of reaching consensus depends on whether a blockchain is permissioned or permission-less. In a permission-less blockchain, a trusted central authority does not exist, and there can be multiple blocks created by different nodes at the same time. The differences in those multiple blocks cannot be reconciled by relying on the received order of the blocks since blocks can arrive at different orders at different locations in the network due to the peer-to-peer transfer process of the blocks. In the absence of trust, 'proof-of-work' mining process can be used to achieve consensus. In other words, each block will be accepted by the other nodes of the blockchain provided it contains an answer to a mathematical problem that is difficult (e.g., time consuming, hence serving as a 'proof-of-work') to solve but easy to verify whether a solution is correct. For example, cryptographic hash functions can be used to create such a mathematical problem. Therefore, a node cannot simply create a block, distribute, and modify a distributed ledger to its advantage, as a node is competing against all other nodes of the blockchain in solving the time consuming problem to generate the next block to be accepted by all nodes. Therefore, unless a single node has computing power equivalent to 51% or more of the entire blockchain nodes combined, other nodes are more likely to solve the problem first and generate the next block. Once a block is generated and distributed to be added to the chain as the next block, other nodes simply verify whether a correct solution to the mathematical problem has indeed been found, and update their respective copy of the blockchain by appending the block to reach consensus. In some implementations, the first node to generate the next block is financially rewarded.

Reaching a consensus in a permissioned blockchain does not involve the computationally intensive 'proof-of-work' mining process due to trust established among the nodes. The validating nodes simply check the validity of a transaction without needing to perform the mining process, then generate a block which in turn will be trusted by the other nodes. In this configuration, the blockchains can be updated in a much faster and more energy-efficient manner. In some implementations, only one block-creation node exists at any time. Therefore, only one block can be generated at any time, eliminating race conditions and conflicts. When a block-creation node becomes inoperative, another node of the blockchain ledger can take over the role by pre-determined mechanisms to maintain the distributed ledger operation. In general, the validating nodes and their compensation structure, if any, can be determined based on the needs of the specific applications for the distributed ledger system.

Material information 127 together with digital signature 128 in distributed ledger 126 can create an immutable and fraud-resistant chain of ownership documentation of physical materials without a trusted central authority. The chain of ownership documentation of the physical materials is immutably bound to the material information 127, which is a digital representation of the underlying physical material, by the operations of the distributed ledger 126. An illustrative example of a life of a physical material in a distributed ledger is given. The life of a physical material in a blockchain ledger begins with the creation, or issuance, of an asset in the blockchain. Material information 127, a uniquely identifying and inseparable digital representation of the physical material, is obtained by the issuer (e.g., producer, miner, farmer, or any point of creation or origination), which is signed to generate a digital signature 128 during the issue process. A copy of the complete material information data can be registered and stored at the verification server 160 as part of an asset issuance process. The cryptographic proof provided by the digital signature 128 ascertains the identity of the issuer, and material information 127 contained in the asset issuance entry uniquely identifies the physical material. The uniqueness of material information 127 also prevents duplicate assets from being issued using the same physical material. Therefore, material information 127, digital signature 128, and alteration-resistance of blockchain in combination enable a secure, transparent, and fraud-resistant digital ledger for physical materials.

A database of the complete material information data of the assets being issued can be maintained in various ways. In some implementations, the database may be a private database maintained by the verification server 160. In some implementations, the database may be stored in a private portion of the distributed ledger 126. In some implementations, the database may be maintained as a secondary blockchain separate from the primary blockchain that records the issuance and tracks subsequent verification events of the asset. The primary blockchain can include a pointer to the secondary block chain for retrieving the complete material information.

Such separation of the primary and secondary blockchains can reduce the size of the primary blockchain, which can improve the speed and overall performance of the primary blockchain. Further, access to the secondary blockchain can be controlled independent of the primary block chain, which can provide additional implementation flexibilities to suit various use cases. For example, access to the complete material information deemed confidential or proprietary by the submitting party may be limited to the verification server 160 and the submitting party.

Additional information related to the identity or provenance of the material may be added at the time of asset issuance. The additional information can include (1) the coordinates of the location (e.g., as determined from a satellite-based positioning system, e.g., the GPS system), (2) the time and date of collection, (3) the name and affiliation of the collector, (4) whether the sample is extracted from weathered rock, (5) whether the sample is extracted directly from a host rock, (6) the zone/bed/pipe/vein from which the sample is extracted, (7) the type of host rock, (8) whether the sample is extracted from mine tailings, the floor of the mine, or a river, (9) a description of the physical sample (e.g., its color, size, inclusions, or host rock), (10) whether the sample is collected with other samples, (11) the type of material, (12) treatment status of the material (e.g., heat treated, cold worked, etc.), (13) the manufacturer of the material, and (14) the production line of the material.

Figure 2:
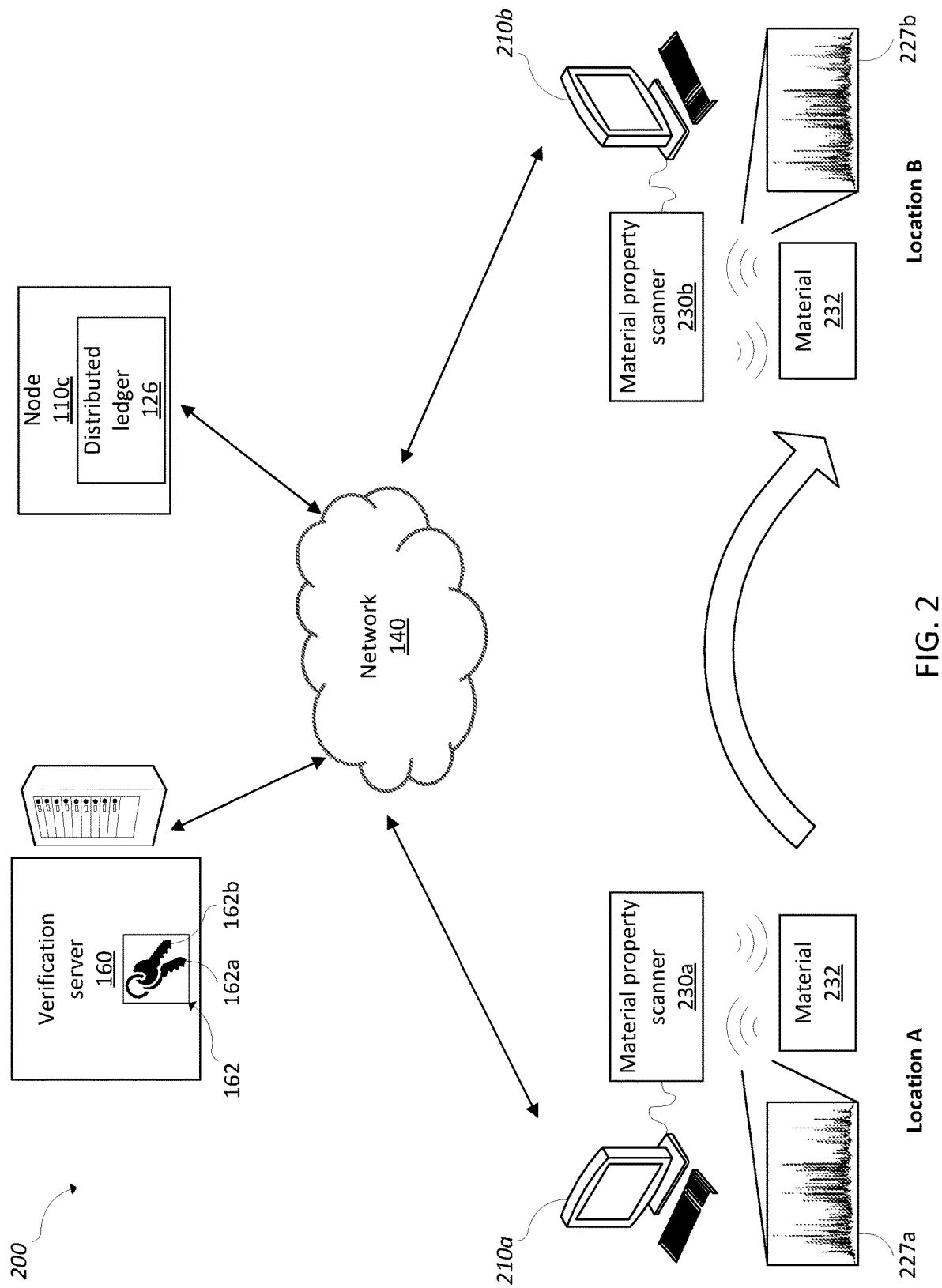
FIG. 2 shows an example of a tracking system for physical materials.

FIG. 2 shows an example of a tracking system 200 for materials, which includes scanning nodes 210a and 210b located at supply chain locations A and B to track material 232. Each of the scanning nodes 210a and 210b is a computing device, and has connected to it a respective material property scanner 230a and 230b for scanning the material 232. The connection can be a physical connection, or a wireless connection. In some implementations, the material property scanners 230a and 230b can be integrated into the respective nodes 210a and 210b (e.g., into a handheld scanner including computing devices 210a, 210b). The nodes 210a and 210b can be connected to one or more distributed ledger nodes 110c and verification server 160 through network 140. Material information 227a and 227b are obtained by using the material property scanners 230a and 230b. In some implementations, the scanning nodes 210a and 210b are also distributed digital ledger nodes that each contains a copy of the distributed ledger 126, such as digital ledger nodes 110a and 110b.

The material property scanner 230a or 230b is an apparatus for collecting material information such as material information 227a or 227b from the material 232. The material property scanner may collect material information using various techniques, including Raman scattering, near infrared spectroscopy, x-ray fluorescence (XRF), Fourier transform infrared spectroscopy (FTIR), inductively coupled plasma mass spectrometry (ICP-MS), laser ablation inductively coupled plasma mass spectrometry (LA-ICP-MS), and laser-induced breakdown spectroscopy (LIBS). An example of material information 227a or 227b collected by the scanner is a spectrum of electromagnetic radiation. An example of the material property scanner 230a or 230b using LIBS techniques include a laser with sufficiently high energy to convert a portion of material 232 to plasma, and a spectrometer with sufficiently high spectral resolution and a sufficiently wide spectral window. The material property scanner using a LIBS technique may perform the following operations: (a) converting a portion of a sample into a plasma multiple times; (b) recording a spectrum of electromagnetic radiation emitted in response to each of the sample conversions to define a sequence of spectra for the sample, in which each member of the sequence corresponds to the spectrum recorded in response to a different one of the sample conversions. In some implementations, material information 227a or 227b can contain multiple sets of measured data from multiple sample locations. The measurement locations may be a grid defined by a number of x, y, and z coordinates.

The converting, for example, can be performed by irradiating a pulse of electromagnetic radiation to the sample. In general, the electromagnetic radiation has sufficient energy to convert a portion of the sample into a plasma. Exemplary electromagnetic radiations include a laser beam (e.g., a 193 nm, 266 nm, 355 nm, 532 nm, or 1064 nm laser beam), an ion beam, an electron beam, and an arc discharge. The plasma thus formed will generally contain various excited atomic elements, which emit electromagnetic radiations when these atomic elements return to a lower energy state.

In some embodiments, the electromagnetic radiations are indicative of atomic emissions. In some embodiments, the electromagnetic radiations can further include those indicative of one or more of isotopic emissions, molecular emissions, molecular structure, molecular isotopic emissions, and spectral interference between atomic emissions from different atoms in the sample.

The recording, for example, can be performed by recording a spectrum of electromagnetic radiation emitted in response to each of the sample conversions (i.e., to form a plasma). In some embodiments, each spectrum is first detected by a detector (e.g., a spectrometer) and then recorded in an electronic processor (e.g., a computer). As a sample is irradiated with electromagnetic radiation (e.g., a laser) multiple times (e.g., at least 3 times) in the converting operation, multiple spectra are obtained from the sample. In general, each spectrum is detected and recorded prior to the next sample conversion by irradiation with electromagnetic radiation. In some embodiments, each spectrum is recorded with a spectral resolution sufficient to resolve the emission of electromagnetic radiation corresponding to atomic emission and one or more of isotopic emission, molecular emission, molecular isotopic emission, and spectral interference between atomic emissions from different atoms. In some embodiments, suitable spectral resolution can be at least 10,000 channels (e.g., at least 20,000 channels, at least 30,000 channels, at least 40,000 channels, at least 60,000 channels, at least 80,000 channels, at least 100,000 channels, at least 200,000 channels, or at least 300,000 channels) and up to as many as 400,000 channels or more. For example, a suitable spectral resolution can be 40,000 or 67,000 channels. Using a high spectral resolution in the methods disclosed herein can resolve fine spectral lines or bands and therefore can increase the accuracy of the final results. For example, when a spectral resolution of as many as 400,000 channels is used in a spectral window between 195 nm and 1005 nm, spectral lines or bands having a width of about 2 pm can be resolved.

In cases where multiple measurements are performed over a grid pattern on a sample using the LIBS technique, it has been observed that when the shot-to-shot interval between successive laser shots is not constant, measured emitted radiation includes signal components that reflect the non-constant intervals. For example, when measurements are performed over an 8×8 square grid pattern of 64 laser shots on the surface of a sample, the measured signal intensity for the first shot of each row of the grid is markedly lower than the measured signal intensity for other shots in the grid. The time delay between the last shot in one of the grid rows and the first shot in the next grid row is longer than the time delay between successive shots in any of the grid rows due to longer translational motion of source. This effect is consistently observed for certain classes of samples and for certain shot grid patterns. To reduce and/or eliminate the effects of non-constant delay times between all shots in an exposure pattern, exposure patterns in which the delay from shot-to-shot is consistent among all shots in the pattern can be used. Additional information pertaining to shot-to-shot intervals and shot patterns for measurements are disclosed in U.S. Patent Publication No. US 2014/0268133 A1 titled "METHODS AND SYSTEMS FOR ANALYZING SAMPLES," which is fully incorporated by reference herein.

In general, standardization of data collection is an important component in successfully implementing a distributed ledger system for physical materials. Standardization of how material information are collected from different material property scanners can enable consistent and accurate verification of material information by the verification server 160. An example of standardization is use of consistent analytical parameters across the material property scanners. Examples of analytical parameters include laser power, gate width, delay times, and integration times. Another example of standardization is consistent use of an inert gas specie, such as argon, nitrogen, or helium. These inert gases can provide a consistent analytical environment, which can help in ensuring that data collected under one set of atmospheric conditions (e.g., a smog filled city) are comparable to data collected in another location (e.g., a pristine laboratory environment).

Use of a calibration sample is another way of standardizing data collection. A calibration sample (e.g., a solid, liquid, gas) can be used to calibrate, for example, the wavelengths, the intensities, or both collected by a spectrometer of a material property scanner. Various factors can cause changes to the registered wavelengths and intensities collected by the spectrometer. An example of such a factor is a change of meteorological conditions (e.g., temperature, humidity, pressure) both inside and outside of the material property scanner. Other examples include physical shocks to the scanner (e.g., dropped, shaken) and cracking of lenses or mirrors used to direct light into the spectrometer. Yet another example is thermal expansion or contraction of the spectrometer gratings. In some implementations, the temperature of the spectrometer gratings is monitored when the material property scanner including a spectrometer is used over a prolonged period of time (e.g., >30 minutes).

Various factors can be considered for selecting a calibration sample. In some implementations, the calibration sample is selected based on a single characteristic of interest, such as a single atomic or isotopic emissions (e.g., of lithium or uranium). In some implementations, the calibration sample is selected based on multiple characteristics, such as multiple atomic and or isotopic emissions, and molecular and molecular isotopic emissions. In some implementations, the selection of the type of a calibration sample is application-specific. A suitable calibration sample can have characteristics that emit through the entire wavelength range over which material information (e.g., spectrum) is collected. For example, for a material property scanner that collects material information over a range of 190-1100 nm, a suitable calibration sample can have characteristics in both the UV and the IR range.

In some implementations, a single calibration sample is used. In some implementations, multiple calibration samples are used. When multiple calibration samples are used, the calibration samples can be used individually or in conjunction. For example, a solid material can be analyzed individually for its characteristics in an analytical environment, such as vacuum, atmospheric air, or inert gas (e.g., argon, helium, nitrogen). In the case when the analytical environment is argon, the characteristics of the solid material as well as the peaks in emissions of argon can be used to calibrate for wavelengths, intensities, or both. For example, a solid material with characteristics in the UV range can be used in an analytical environment filled with a gas having emissions primarily in the IR range of the spectrum. Such combination can enable calibration of the entire spectrometer from a single measurement instead of multiple individual measurements of multiple materials, as characteristics across the entire range of acquisition can be captured in a single measurement. Performing calibrations using characteristics that that span the entire spectral range can help ensure the integrity of the acquired material information.

In some implementations, a calibration of wavelength measurements can be performed using a light source with distinct spectral lines, e.g., a mercury lamp, and a calibration of intensity measurements can be performed using other light sources, e.g., halogen, deuterium-tungsten. In some implementations, depending on the specific application, the material property scanner can be calibrated using the light sources at regular intervals (e.g., 10 minutes, 30 minutes, 1 hour, 4 hours, 12 hours). In some implementations, calibration using the calibration sample(s) can be performed based on various rules, e.g., before every sample, every other sample, every $5^{th}$ sample, every $10^{th}$ sample.

Moreover, while a material property scanner is described, the distributed ledger systems and techniques described herein can include one or more sensors that employ various types of sensor technologies (active, passive, or both) for obtaining various types of material information. Examples of sensors include a pH level sensor for measuring pH levels of liquids and a DNA sequencer.

Referring again to FIG. 2, the material 232 is first scanned at location A using the material property scanner 230*a* of the scanning node 210*a*. The scanning node 210*a* processes the data generated by the scan and generates the material information 227*a*. The scanning node 210*a* then sends the material information 227*a* to the verification server 160. The verification server 160 verifies whether the material information 227*a* matches that of the previous entries of the material, which may include the asset issuance, or more generally that the information matches the expectations (e.g., as defined in a reference library) for the material 232. If the verification is successful, the verification server 160 provides verification information. In some implementations, the verification information is the digital signature 128 (e.g., a set of bits that result from cryptographically processing at least a portion of the material information 227*a* using the private key 162*b* of the verification server 160). The provided digital signature 128 can be later used to verify whether the material 232 has been verified at this location. The digital signature 128 is received by the scanning node 210*a*, which verifies the digital signature 128 by decrypting it with the public key 162*a* of the verification server 160. Once the scanning node 210*a* completes the verification, the scanning node 210*a* initiates addition of a distributed ledger entry containing the material information 227*a* and the digital signature associated with the information 227*a*. In this example, the entry describes the departure of the material 232 from location A for location B. Subsequently, the distributed ledger nodes, such as the node 110*c*, validate the received ledger entry for addition. In some implementations, the validation includes verifying the digital signature contained in the received ledger entry by decrypting it with the public key 162*a* of the verification server 160. Once the received ledger entry is validated, it is added to the blockchain ledger.

The digital signature 128 may be generated based at least on information usable to identify the material information. In some implementations, the digital signature 128 generated by the verification server 160 is the material information 227*a* encrypted using the private key 162*b*. In some implementations, the digital signature 128 is generated from a subset of the material information 227*a*. The subset of the material information 227*a* can be generated in various ways. In some implementations, the subset is the first pre-determined number of bits of the material information 227*a*. In some implementations, the subset is the last pre-determined number of bits of the material information 227*a*. In some implementations, the subset is a pre-determined number of bits of the material information 227a at a predetermined bit location. In some implementations, the digital signature 128 is generated by encrypting a hash value of the material information 227a using the private key 162b. In some implementations, the digital signature 128 is generated by encrypting a pointer, to an entry in a material information database storing the material information 227a, using the private key 162b. The material information database may be, for example, a private database maintained by the verification server 160, a private distributed ledger separate from the distributed ledger 126, or a private portion of the distributed ledger 126.

In some implementations, multiple algorithms for generating digital signature 128 are stored in a look up table. In general, material information 227a can have different characteristics (e.g., number of bits, data structure) for different types of materials and/or different applications. Accordingly, it can be beneficial to use different algorithm to generate digital signatures 128 for materials of different types. Examples of benefits for using different algorithm can include computational efficiency, smaller file size of a digital signature, and reduced possibility for hash collision. The algorithms stored in the look up table can include hashing functions. Examples of hashing functions stored in the lookup table include VMAC, UMAC, BLAKE-256, BLAKE-512, BLAKE2, MD2, MD4, MD5, MD6, SHA-1, SHA-224, SHA-256, SHA-384, SHA-512, SHA-3, and universal one-way hash functions.

Upon arrival at location B, the material 232 is scanned again with the scanner 230b as part of the receiving and acceptance process. The scanning node 210b processes the data generated by the scan and generates the material information 227b ('first set of information'). The scanning node 210b also retrieves a second set of information from the previous ledger entry added at location A from the distributed ledger 126. The second set of information includes the material information 227a from location A and the associated digital signature contained in the ledger entry. In some implementations, the second set of information can include various criteria for the material. For example, the criteria can include expected current location of the material. The scanning node 210b sends the first and second sets of information to the verification server 160 over the network 140 for verification of the identity of the received material. In some implementations, the verification can include verifying the digital signature of material information at location A using the public key 162a; analyzing the material information 227b from location B and the material information 227a from location A to determine whether the two sets of material information 227a and 227b are substantially the same, indicating that they are of the same material. If the verification is successful, the verification server 160 provides a digital signature 128 as a proof of successful verification.

Once the digital signature verifying the identity of the material received at location B is received by the scanning node 210b, the scanning node 210b verifies the digital signature 128 by decrypting it with the public key 162a of the verification server 160. Once the scanning node 210b completes the verification, the scanning node 210b initiates addition of a distributed ledger entry containing the material information 227b and the digital signature associated with the information 227b. In this example, the entry describes the reception of the material from location A and acceptance of the material at location B. Subsequently, the distributed ledger nodes, such as the node 110c, validate the entry and, if validation is successful, add it to the blockchain. Therefore, a secure and accurate chain of a material's ownership and location has been established by using blockchain ledger and material information generated by the material property scanners.

In some cases, materials can undergo a transformative process. In such cases, it may be desirable to document the performed transformative process to establish traceability of materials through the transformative process. For example, the traceability can be important for materials used in aerospace parts and military equipment, as incorrect or omitted transformative processing steps can result in catastrophic failure of the material.

Figure 3:
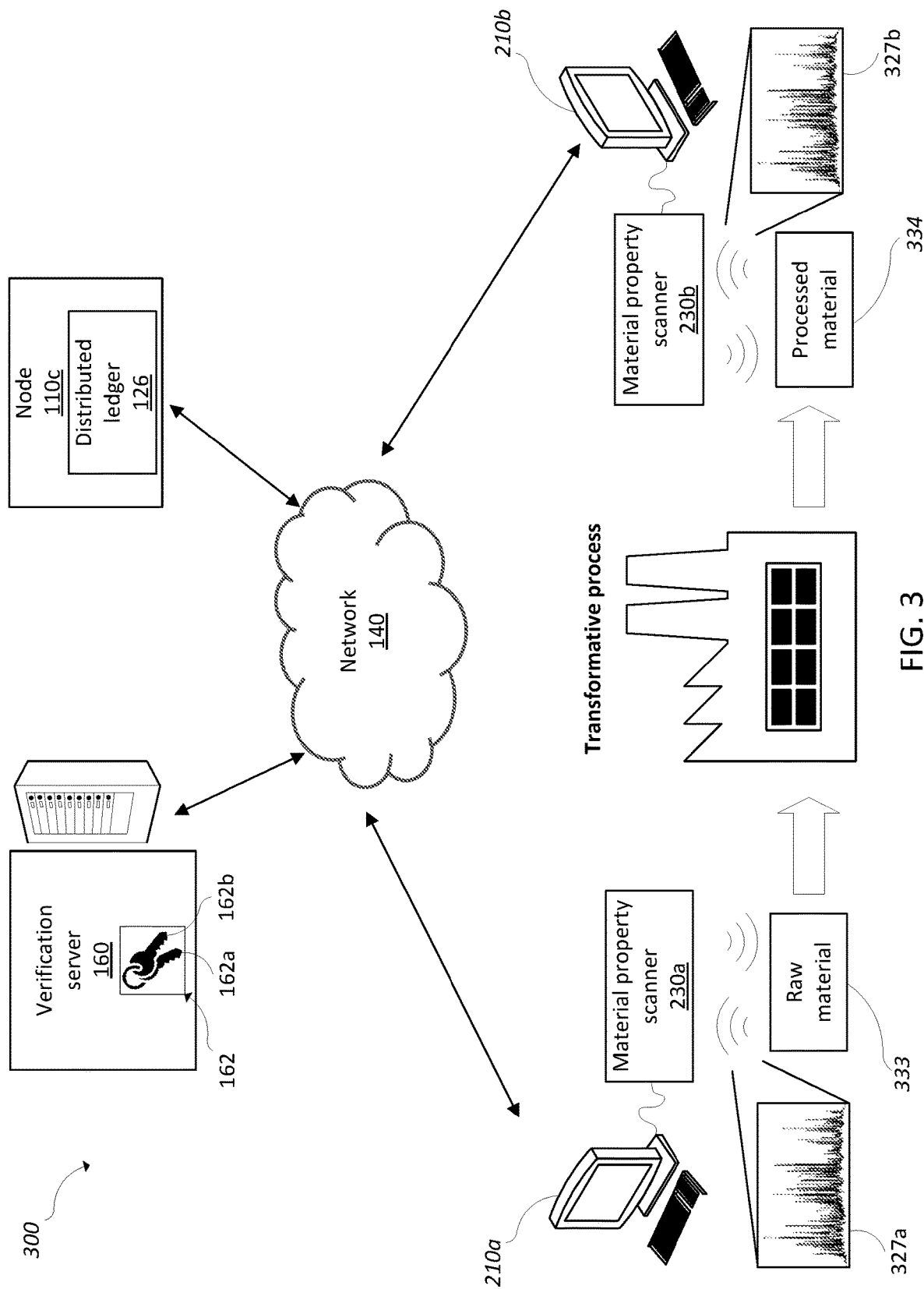
FIG. 3 shows an example of a tracking system for physical materials undergoing a transformative process.

FIG. 3 shows an example of a tracking system 300 for materials undergoing a transformative process. The system 300 includes scanning nodes 210a and 210b and their respective material property scanner 230a and 230b for scanning the raw material 333 and processed material 334. Scanning nodes 210a and 210b can be connected to one or more distributed ledger nodes 110c and verification server 160 through network 140. First, uniquely identifying characteristics of the transformative process to be used for verification is determined. In some implementations, the characteristics are registered to the verification server 160. For example, the characteristics may be stored in a private database maintained by the verification server 160 to maintain confidentiality of the uniquely identifying characteristics. The characteristics may include the differences in material information between a material's raw and processed state, and the detected differences can span a single channel or multiple channels depending on the nature of the transformative process.

In general, uniquely identifying characteristics can be based on a chemical change, a physical/structural change, or both. Various examples of transformative processes that can lead to uniquely identifying characteristics include: addition or removal of materials (e.g., single atomic elements, molecules, compounds); casting & forging; heat treatment; cold working; aging & tempering; hipping; a surface treatment such as shot peen, hone, grit blast, media finishing, polishing; plating & coating; machining such as mechanical or electrical discharge machining (EDM); annealing; acid washing; phase changes, high pressure processes, passivation; and nitriding & carburizing.

Additional examples of transformative processes include additive manufacturing processes. For example, a powdered metal can be "printed" onto an aerospace part, or a plastic part can be printed using three dimensional (3D) extrusion printing or other additive manufacturing systems and techniques. Other examples of transformative processes include addition of materials to induce a chemical, structural (e.g., change in lattice or microstructures), or phase change. Material additions can be performed in large or small quantities. When performed in small quantities, the process is typically referred to as "doping." In general, doping is performed to intentionally add an element or chemical to a material to change the properties of the material. An example of doping is adding less than 1000 ppm (parts per million) of doping material to a primary material. In another example, in the case of semiconductor device fabrication, doping is performed to modify the electrical properties of a semiconducting material. In the case of gemstones, doping can be performed to change the color of a gemstone or its clarity.

Raw material 333 is scanned using the material property scanner 230a before undergoing the transformative process to generate material information 327a. Scanning node 210a initiates addition of a ledger entry describing the transformative process to be applied to raw material 333 using procedures similar to the procedures used by the scanning node 210a of FIG. 2.

Upon completion of the processing of raw material 333 into processed material 334, processed material 334 is scanned again with the material property scanner 230b as part of the acceptance process. The scanning node 210b processes the data generated by the scan and generates the material information 327b ('first set of information'). The scanning node 210b also retrieves a second set of information from the previous ledger entry added before the transformative process from the distributed ledger 126. The second set of information includes the material information 327a of the raw material 333, the associated digital signature contained in the ledger entry, and a set of criteria regarding the expected current characteristics of the processed material 334. The scanning node 210b sends the first and second set of information to the verification server 160 over the network 140 to verify successful completion of the transformative process as evidenced by the material information 327b of the processed material 334. The methods for verifying successful completion of a transformative process can depend on the specific nature of the transformative process. Examples of verification methods include simple subtraction, partial least square—discriminant analysis (PLS-DA), principal component analysis (PCA), classification using a neural network, and cluster analysis. If the verification is successful, the verification server 160 provides a digital signature 128 as a proof of successful verification.

Once the digital signature verifying the successful completion of the transformative process is received by scanning node 210b, the scanning node 210b verifies the digital signature and initiates addition of a distributed ledger entry using procedures similar to the procedures used by the scanning node 210b of FIG. 2.

The previous example described transformation of a raw material into a processed material through a transformative process. However, transformation of material may also include combination of two or more raw materials to create one processed material (e.g., creating a metallic alloy or a chemical compound).

Figure 4:
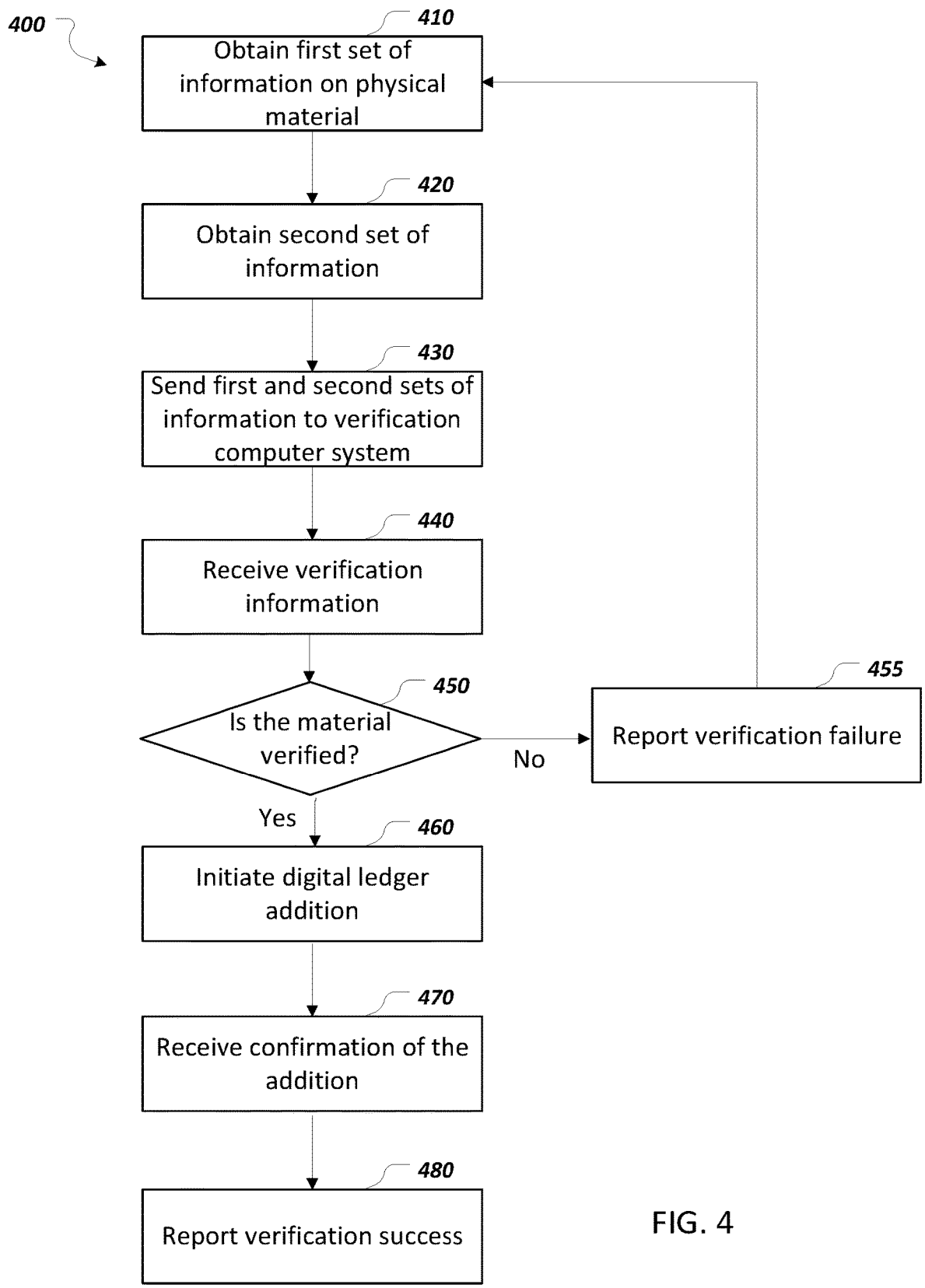
FIG. 4 shows a flowchart of an example of a process for verifying a material using a distributed ledger.

FIG. 4 shows a flowchart of an example of a process 400 to verify a physical material and add the verification event to a distributed digital ledger. Initially, a computer obtains 410 a first set of information regarding a physical material to be verified. For example, this information may be material information 227a collected by the material property scanner 230a. In some implementations, the information may be hundreds of values for channels of a spectrum of electromagnetic radiation that represent physical characteristics of the physical material, where the obtaining 410 includes irradiating the physical material, receiving the spectrum of electromagnetic radiation responsive to the irradiating, and generating the hundreds of values from the received spectrum of electromagnetic radiation.

The computer obtains 420 a second set of information regarding the physical material to be verified. For example, the second set of information can be obtained from the distributed digital ledger. In some implementations, the second set of information can include previously produced material information that have been added to the blockchain and a digital signature associated with the previously produced material information. In some implementations, the second set of information may include a pointer to a material information entry in a public or private material information database, the entry corresponding to the physical material to be verified. For example, the entry can contain previously acquired and verified material information of the physical material to be verified. As another example, the entry can contain reference material information representative of the characteristics of the physical material to be verified. In implementations where the distributed digital ledger includes a public distributed digital ledger and a private distributed digital ledger, the second set of information can include a pointer to a material information entry in the private distributed digital ledger, the entry corresponding to the physical material to be verified. In some implementations, the second set of information can include various criteria for the material. Examples of criteria include expected current location and expected current characteristics of the material in the supply chain.

The computer sends 430 the first and second set of information to verification computer system. Verification server receives the first and second set of information. Upon completion of the verification, the verification result is sent back to the computer.

In some implementations, the complete material information is stored in a database or a distributed ledger maintained by the verification server 160. In such cases, the verification server retrieves the complete material information from the material information database or distributed digital ledger using the pointer included in the second set of information. The verification server 160 then performs the verification operation based on the received first set of information and the retrieved complete material information. If the verification is successful, the verification server stores the received first set of information in the material information database or the distributed digital ledger and includes, in the verification information, a pointer to the first set of information stored in the database of the distributed digital ledger. The verification information may also include a digital signature generated by encrypting the pointer with the private key 162b of the verification server 160.

The computer receives 440 verification information and determines 450 the verification status. For example, a digital signature can be checked to confirm the verification information originated from the verification server. If the verification has failed, verification failure is reported 455, and a retry of the verification may be initiated by returning to obtaining 410 the first set of information.

If the material is verified, the computer initiates 460 digital ledger addition. In some implementations, the initiation may include broadcasting of the ledger entry to be added to other nodes of a blockchain ledger. Nodes of the blockchain ledger may generate a new block and reach a consensus, at which point a confirmation may be sent back to the computer. In some implementations, a confirmation request may have to be sent by the computer to the nodes of the blockchain ledger. In some implementations, the ledger entry being added to the blockchain ledger may contain the hundreds of values representing physical characteristics of the verified physical material. In some implementations, the ledger entry being added to the blockchain ledger may contain a pointer to a database or distributed ledger entry storing the hundreds of values representing physical characteristics of the verified physical material.

The computer receives 470 confirmation of the distributed ledger addition. In some implementations, such as a permissioned blockchain ledger, reception of a single confirmation from a trusted validating node can be a sufficient indication of distributed ledger addition. In some implementations, such as a permission-less blockchain ledger, a minimum number of received confirmations can be used to improve confidence in a determination of ledger addition. For example, the minimum number can be determined as a percentage of the total number of distributed nodes in a system. The percentage, for example, can be 51%, 66%, 75%, or 90%. In some implementations, a minimum number of blocks appended since the addition of the distributed ledger entry can be used to improve confidence in a determination of ledger addition. For example, the minimum number of blocks added can be 1, 3, 5, 6, or 9 blocks. When sufficient confirmations are received, the computer reports 480 verification success, completing the verification process.

Figure 5:
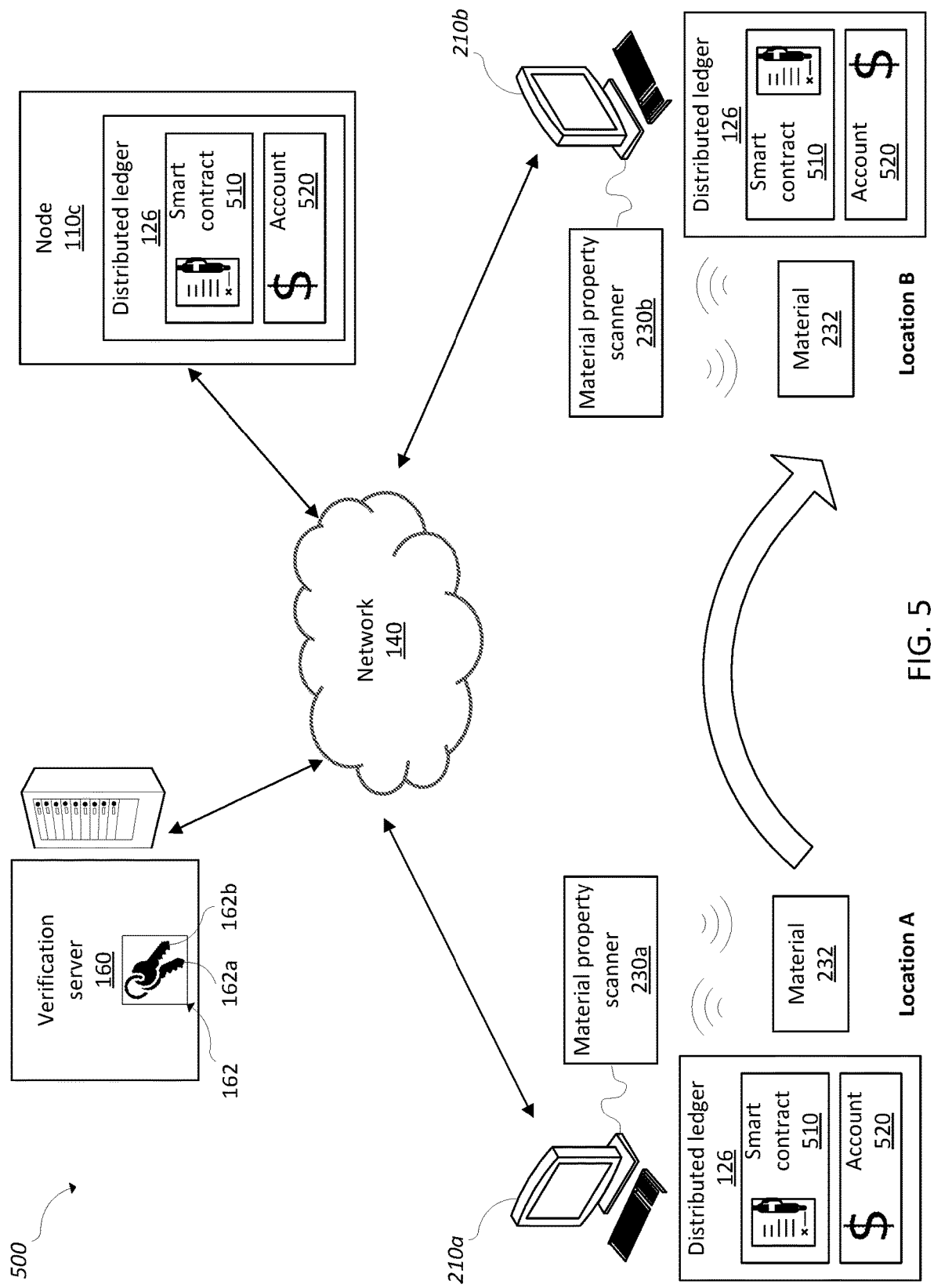
FIG. 5 shows an example of a distributed ledger system containing smart contracts for physical materials.

FIG. 5 shows an example of a distributed ledger system 500 containing smart contracts for physical materials. The distributed ledger 126 includes a smart contract 510 and a payment account 520. In addition to its use in physical material verification, blockchain-based distributed ledger technology can be extended to cover the creation and execution of contracts involving physical materials. For example, the smart contract 510 can be added as an entry in a blockchain-based distributed ledger 126. The smart contract 510 includes conditions that can be triggered by a specific blockchain entry, and actions to be performed when certain conditions are met. The actions are typically transfers of payments from the payment account 520 of a party of the smart contract 510 to the payment account 520 of a second party of the smart contract 510. The conditions of the smart contract 510 can be any ledger entries that can be added to the distributed ledger 126. For example, the condition can be receiving of a verified material at a location. As another example, the condition can be a determination that the processed material 334 has the expected characteristics from completion of a transformative process.

Various conditions for smart contracts are contemplated. For example, a party may wish to ensure that the diamond to be purchased originated from a conflict free origin. In such cases, the execution of the contract can be based on the confirmation of the provenance of the diamond. As another example, a purchaser may desire to verify that the active pharmaceutical ingredient is present and in specified quantity. In such cases, the execution of the contract can be based on the verification of that information. In yet another example, a purchaser can require a verification of a specific type of metal alloy (e.g., nickel alloy) that has been treated to a certain standard. In such cases, the execution of the contract can be based on the verification of the material having both the correct composition and the correct treatment. As a further example, execution of the contract can be based on confirmation of the type and condition of a meat product, e.g., whether a meat product is chicken and that the chicken is antibiotic free, or whether the meat is beef and not horse. In yet another example, for some products embedded with DNAs, execution of the contract can be based on confirmation that the product is in-fact treated with DNA, and that the DNA is of the correct strain. In general, the execution trigger for a contract can be confirmation that the material (1) came from the correct origin, (2) contains the correct constituents, (3) is free from certain constituents (e.g., free of antibiotics, bpa (bisphenol A), high fructose corn syrup, etc.), (4) has underdone the correct transformation process, (5) contains the correct traces of DNA, or a combination of these.

The smart contract 510 can be enforced by a validating node of the blockchain ledger. When a ledger entry to be added references the smart contract 510, the validating node of the blockchain ledger checks whether a condition of the smart contract 510 is satisfied by the addition of the entry. If the condition is satisfied, the validating node executes the corresponding actions. In some implementations, execution of corresponding actions can include initiating addition of a payment entry to the distributed digital ledger. These kinds of automatically executed contracts are called smart contracts, and they do not require an intermediary for enforcement of the contract.

In some implementations, separate distributed ledgers are maintained for smart contracts and cryptocurrency using pegged sidechain technology that enables multiple distributed ledgers to run side by side and assets to be transferred across ledgers. Some commercial examples of smart contracts using blockchain technology include Ethereum from Ethereum Foundation (Zug, Switzerland) and Codius from Codius.org.

An illustrative example of a smart contract based on blockchain is given. Referring to FIG. 5, a smart contract 510 is added to the distributed ledger 126. The smart contract 510 stipulates that party A is to deliver material 232 from location A to party B at location B, and party B is to pay 100 dollars (or equivalent cryptocurrencies or tokens) upon delivery. With conventional contracts, party A would then have to deliver the material to party B, invoice against the contract (e.g., purchase order), then wait for party B to process the invoice to receive the due payment. With smart contracts, the material 232 is delivered to party B, party B scans the material 232 with the material property scanner 230b, verifies the identity of the received material 232, and initiates the addition of a ledger entry. The addition of the ledger entry triggers the smart contract 510, and upon successful validation by a validating node, the blockchain ledger automatically executes the terms of the smart contract 510 by transferring 100 dollars from the payment account 520 of party B to the payment account 520 of party A. In general, the payment can be performed in various ways. In some implementations, the payment can be performed using blockchain transfers of cryptocurrencies. In some implementations, the payment can be performed using conventional bank transfers.

Figure 6:
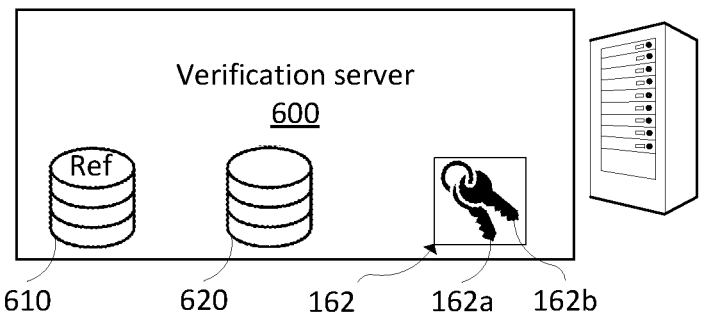
FIG. 6 shows an example of a verification server.

In general, reference libraries and material information databases can be stored in various nodes of a distributed ledger system and in various configurations. FIG. 6 shows an example of a verification server 600. The verification server 600 includes a reference library 610 and a material information database 620. The verification server 600 may control access to the reference library 610. For example, new entries may only be added to the reference library 610 by the operator of the verification server 600 to add capability for verifying new materials. As another example, access to the reference library 610 may be limited to the verification server 600 and the respective contributors to the reference library 610. The material information database 620 may store material information acquired during distributed ledger transactions, such as material information 227a, 227b, 327a, and 327b. The verification server 600 may control access to the material information database 620. For example, for a private material information database 620, access to the entries of the database 620 may be limited to the verification server 600 and the respective parties of a distributed ledger transaction. While illustrated as separate entities, in some implementations, the reference database 610 and the material information database 620 may be integrated into a single database.

Figure 7:
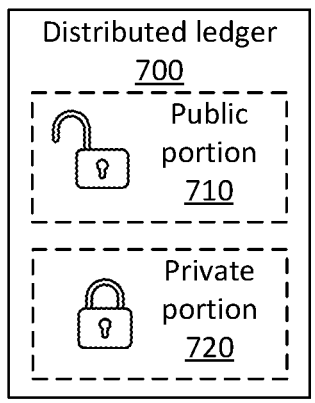
FIGS. 7 and 8 show examples of distributed ledgers having different configurations.
Figure 8:
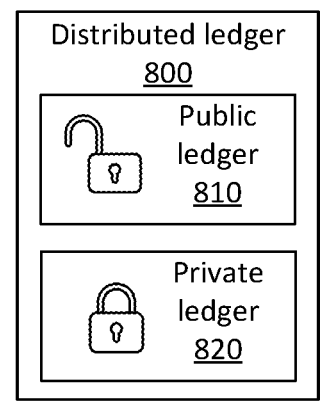

In general, a distributed ledger system can be set up with different data structures, data types, transaction types, permission levels, access control, data segregation, etc. to suit the needs of different applications. FIGS. 7 and 8 show examples of distributed ledgers having different configurations. Referring to FIG. 7, a distributed ledger 700 includes a public portion 710 and a private portion 720. The public portion 710 may be an unencrypted portion containing plain-text information that can be processed by anyone with access to the distributed ledger 700. The private portion 720 may be an encrypted portion containing encrypted information. In some implementations, each distributed ledger entry may have data stored in each of a public portion 710 and a private portion 720 of a distributed ledger 700. For example, the private portion 720 of a distributed ledger entry may contain material information 227a, 227b, 327a, or 327b, and the public portion 710 of the distributed ledger entry may contain a digital signature of the corresponding material information 227a, 227b, 327a, or 327b. In this configuration, all information is included in a single distributed ledger 700 and is publicly accessible, but the encryption of the private portion 720 that holds sensitive information, such as the material information, prevents processing of the sensitive information contained in the private portion 720 by others except for the parties holding the decryption key for the private portion 720.

Referring to FIG. 8, a distributed ledger 800 includes a public distributed ledger 810 and a private distributed ledger 820. Different from the distributed ledger 700, the distributed ledger 800 has two separate distributed ledgers 810 and 820 with different levels of access. The public ledger 810 may be a generally accessible distributed ledger that records the distributed ledger transactions of various physical materials. The private ledger 820 may be an access-controlled ledger that records sensitive information associated with the entries of the public distributed ledger 810, such as the material information 227a, 227b, 327a, and 327b. The entries of the public distributed ledger 810 may include pointers to the entries in the private distributed ledger 820. Access to the private ledger 820 may be limited to a verification server associated with the distributed ledger 800 and the respective parties of a distributed ledger transaction to maintain confidentiality of the sensitive information. Moreover, some distributed ledger nodes in such a system may only have a copy of the public distributed ledger 810, and only an approved subset of the distributed ledger nodes will have a copy of the private ledger 820.

In the various distributed ledger systems for physical materials described, the verification process performed by a verification server, such as the verification servers 160 and 600, plays an integral role in the overall operation and integrity of the system. The reference library containing material information of reference materials, which serves as the basis for identity and provenance verification, is an important component of the verification process implemented by the verification server. As such, building and maintaining a comprehensive and accurate reference library are important to the operation of the distributed ledger system as a whole. One way of facilitating contribution of reference material information to the reference library is by providing the various users of the verification server, such as manufacturers, suppliers, and buyers, with various forms of incentives.

In the material supplier industry, various corporations have materials of importance to them, and the corporations typically maintain their own material database for authenticating their own materials. The corporations may each have their own standards and verification methodology that are local to them and those standards and methodologies are not made available outside of the respective corporations. However, corporations may benefit from granting others access to their verification methodology, such as allowing enabling their verification methodology to be performed around the world and increasing uniformity of verification results from across the world. As such, a nominal financial incentive may be sufficient to induce the corporations to contribute to the reference library. For example, for each verification operation on a particular material, a financial incentive in a form of royalty payment may be provided to the party that contributed the reference material information and/or the verification methodology.

Figure 9:
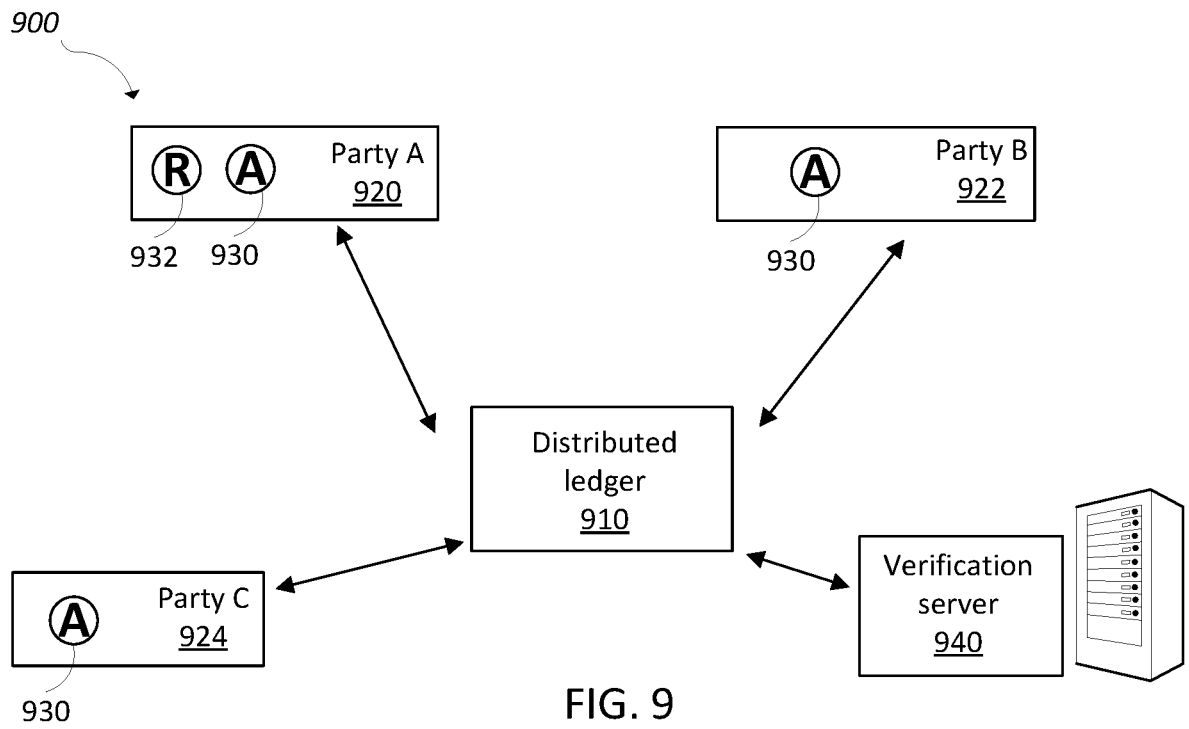
FIG. 9 shows an example of a distributed ledger system with incentives.

The financial incentive may be provided in various manners. FIG. 9 shows an example of a distributed ledger system 900 with incentives. The distributed ledger system 900 includes a distributed ledger 910, a verification server 940, and parties A 920, B 922, and C 924 performing distributed ledger transactions for physical materials. The parties have tokens 930. The tokens 930 may be generated and distributed by smart contracts of the distributed ledge 910. The tokens 930 may have royalty rights linked to the usage of the reference library. In some implementations, a token holder may get two types of incentives. First, the token holders receive a new token or a cryptocurrency. Second, the token holders receive the rights to royalties from a Royalty Fund. Every time the reference library is used to authenticate a material, the user pays a small fee which goes into the Royalty Fund, which is later distributed to the token holders. These tokens may be exchanged for other tokens, cryptocurrencies, or fiat currencies, which can be used to pay for the operation cost of the distributed ledger system as well as provide incentives for the users of the distributed ledger system to contribute to the reference library.

In some implementations, a two token model may be used. The two token model is similar to the model described above, but differs in that two different types of tokens are now used, in which a royalty token 932 entitles the holders of the royalty token to royalty payments, and an analysis token 930 is used to pay for the verification services.

In an example operation of the two token model, a fee is charged to access the reference library through the verification server 940 associated with the distributed ledger 910. The reference library may be specialized to a particular material type, such as diamonds, coffee beans, apples, or steel. Analysis tokens are used to pay for future verification services in the distributed ledger ecosystem. The analysis token holders pay for verification at a rate substantially discounted from the prices set for usage by those not paying with an analysis token (e.g., paying with regular cryptocurrencies). Each analysis token allows the holder to query the reference library once. Fees paid (including those paid in the form of analysis tokens) less operational costs, are held in a pool, and distributed to the royalty token holders, such as the party A 920, in the form of a royalty payment. A royalty token holder's royalty rights are proportional to the total number of tokens in the royalty pool. So, a token holder who owns 1% of all royalty tokens in existence receives 1% of the royalties distributed to the royalty fund. Both analysis and royalty tokens are generally transferable. However, when the analysis token is submitted as payment for verification services rendered, the analysis token returns to being property of the token issuer (e.g., the operator of the verification server 940).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is or may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiment described above can be combined with any of the other features of the embodiment described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   obtaining, at a computer coupled with a communication network, a first set of information regarding a diamond material to be verified, the first set of information comprising hundreds of values for channels of a spectrum of electromagnetic radiation emitted by the diamond material in response to an irradiation of the diamond material by electromagnetic radiation having sufficient energy to convert a portion of the diamond material into a plasma, wherein the irradiation of the diamond material has been performed by a scanner that has been calibrated (i) for wavelength measurements using a light source with distinct spectral lines and (ii) for intensity measurements using a deuterium-tungsten light source, the hundreds of values representing physical characteristics of the diamond material to be verified;
   obtaining, at the computer coupled with the communication network, a second set of information regarding the diamond material to be verified;
   sending, by the computer, the first and second sets of information over the communication network to a verification computer system;
   receiving, at the computer, verification information from the verification computer system, the verification information comprising a digital signature by the verification computer system of at least information usable to identify the first set of information, the digital signature having been generated by encrypting the at least information usable to identify the first set of information using a private key portion of an asynchronous encryption key pair used by the verification computer system;
   initiating, by the computer, addition of the information usable to identify the first set of information and the digital signature to a distributed digital ledger;
   receiving, by the computer, confirmation of the addition of the information usable to identify the first set of information and the digital signature to the distributed digital ledger; and
   reporting, by the computer, that the diamond material has been verified responsive to receipt of the confirmation.

2. The method of claim 1, wherein the information usable to identify the first set of information is the first set of information.

3. The method of claim 2, wherein the hundreds of values for channels of the spectrum of electromagnetic radiation comprise at least forty thousand channels of data from the spectrum of electromagnetic radiation.

4. The method of claim 2, wherein the hundreds of values for channels of the spectrum of electromagnetic radiation comprise at least three hundred channels of data from the spectrum of electromagnetic radiation.

5. The method of claim 2, wherein the hundreds of values for channels of the spectrum of electromagnetic radiation are indicative of isotopic emissions, molecular emissions, molecular structure, molecular isotopic emissions, spectral interference between atomic emissions from different atoms in the diamond material, or a combination thereof.

6. The method of claim 2, wherein the computer is part of an analysis system, wherein a number of the channels of the spectrum used to verify an identity or provenance of the diamond material is application-specific, wherein the digital signature is a first digital signature, and wherein:
   obtaining the first set of information comprises irradiating the diamond material, receiving the spectrum of electromagnetic radiation responsive to the irradiating, and generating the hundreds of values from the received spectrum of electromagnetic radiation;
   obtaining the second set of information comprises retrieving from the distributed digital ledger (a) previously produced hundreds of values for channels of the spectrum of electromagnetic radiation emitted by the diamond material in response to a previous irradiation of the diamond material and (b) a second digital signature of at least the previously produced hundreds of values, and verifying the second digital signature using a public key portion of the asynchronous encryption key pair used by the verification computer system; and
   sending the first and second sets of information comprises sending the generated hundreds of values and the previously produced hundreds of values to the verification computer system.

7. The method of claim 6, wherein the light source with distinct spectral lines comprises a mercury lamp, the method comprising:
   verifying the first digital signature using the public key portion of the asynchronous encryption key pair used by the verification computer system;
   checking that one or more conditions of a transfer are met in addition to the verification of the first digital signature; and
   initiating payment for the transfer responsive to the checking.

8. The method of claim 7, comprising identifying the one or more conditions of the transfer from a record in the distributed digital ledger associated with the second set of information, and wherein initiating payment for the transfer comprises initiating the addition to the distributed digital ledger.

9. The method of claim 2, wherein:
   the distributed digital ledger comprises a public distributed digital ledger and a private distributed digital ledger, the private distributed digital ledger comprising a first entry comprising the hundreds of values for channels of the spectrum of electromagnetic radiation;
   obtaining the second set of information regarding the diamond material to be verified comprises obtaining, from the public distributed digital ledger, the second set of information comprising a second pointer to a second entry of the private distributed digital ledger regarding the diamond material to be verified;

the digital signature of the information usable to identify the first set of information comprises a digital signature of a first pointer to the first entry of the private distributed digital ledger; and initiating addition of the information usable to identify the first set of information and the digital signature to the distributed digital ledger comprises initiating addition of the first pointer to the public distributed digital ledger.

10. The method of claim 2, wherein:

the distributed digital ledger comprises a public portion and a private portion, the public portion comprising plain-text information and the private portion comprising encrypted information; and the first set of information is stored in the private portion of the distributed digital ledger, and the digital signature is stored in the public portion of the distributed digital ledger.

11. The method of claim 2, wherein the computer is part of a tracking system, wherein the digital signature is a first digital signature, wherein obtaining the first set of information comprises receiving the hundreds of values, wherein obtaining the second set of information comprises identifying a current set of criteria for the diamond material at a current location in a supply chain, wherein sending the first and second sets of information comprises sending the hundreds of values and the current set of criteria for the diamond material at the current location in the supply chain, and wherein the method further comprises:

verifying the first digital signature using a public key portion of the asynchronous encryption key pair used by the verification computer system;

retrieving from the distributed digital ledger (a) previously produced hundreds of values for channels of the spectrum of electromagnetic radiation emitted by the diamond material in response to a previous irradiation of the diamond material at a previous location in the supply chain and (b) a second digital signature of at least the previously produced hundreds of values, the second digital signature having been created to verify the diamond material at the previous location in the supply chain;

verifying the second digital signature using the public key portion of the asynchronous encryption key pair used by the verification computer system; and initiating the addition to the distributed digital ledger only after verification of both the first digital signature and the second digital signature.

12. The method of claim 11, wherein the diamond material at the previous location in the supply chain is an uncombined raw material, and the diamond material at the current location in the supply chain is combined with at least one other physical material.

13. The method of claim 1, wherein the information usable to identify the first set of information is a first pointer to a first entry comprising the hundreds of values for channels of the spectrum of electromagnetic radiation.

14. The method of claim 13, wherein:

a private material information database comprises the first entry comprising the first set of information;

obtaining the second set of information regarding the diamond material to be verified comprises obtaining, from the distributed digital ledger, the second set of information comprising a second pointer to a second entry of the private material information database regarding to the diamond material to be verified;

the digital signature of the information usable to identify the first set of information comprises a digital signature of a first pointer to the first entry of the private material information database; and initiating addition of the information usable to identify the first set of information and the digital signature to the distributed digital ledger comprises initiating addition of the first pointer to the distributed ledger.

15. The method of claim 14, wherein the private material information database is a private distributed digital ledger.

16. The method of claim 1, wherein the information usable to identify the first set of information is a hash of the first set of information.

17. A non-transitory computer-readable medium encoding a computer program operable to cause data processing apparatus to perform operations comprising:

obtaining a first set of information regarding a diamond material to be verified, the first set of information comprising hundreds of values for channels of a spectrum of electromagnetic radiation emitted by the diamond material in response to an irradiation of the diamond material by electromagnetic radiation having sufficient energy to convert a portion of the diamond material into a plasma, wherein the irradiation of the diamond material has been performed by a scanner that has been calibrated (i) for wavelength measurements using a light source with distinct spectral lines and (ii) for intensity measurements using a deuterium-tungsten light source, the hundreds of values representing physical characteristics of the diamond material to be verified;

obtaining a second set of information regarding the diamond material to be verified;

sending the first and second sets of information over a communication network to a verification computer system;

receiving verification information from the verification computer system, the verification information comprising a digital signature by the verification computer system of at least information usable to identify the first set of information, the digital signature having been generated by encrypting the at least information usable to identify the first set of information using a private key portion of an asynchronous encryption key pair used by the verification computer system;

initiating addition of the information usable to identify the first set of information and the digital signature to a distributed digital ledger;

receiving confirmation of the addition of the information usable to identify the first set of information and the digital signature to the distributed digital ledger; and reporting that the diamond material has been verified responsive to receipt of the confirmation.

18. The non-transitory computer-readable medium of claim 17, wherein the information usable to identify the first set of information is the first set of information.

19. A system comprising:

a user interface device; and one or more computers operable to interact with the user interface device and to obtain a first set of information regarding a diamond material to be verified, the first set of information comprising hundreds of values for channels of a spectrum of electromagnetic radiation emitted by the diamond material in response to an irradiation of the diamond material by electromagnetic radiation having sufficient energy to convert a portion of the diamond material into a plasma, wherein the irradiation of the diamond material has been performed by a scanner that has been calibrated (i) for wavelength measurements using a light source with distinct spectral lines and (ii) for intensity measurements using a deuterium-tungsten light source, the hundreds of values representing physical characteristics of the diamond material to be verified;

obtain a second set of information regarding the physical diamond material to be verified;

send the first and second sets of information over a communication network to a verification computer system;

receive verification information from the verification computer system, the verification information comprising a digital signature by the verification computer system of at least information usable to identify the first set of information, the digital signature having been generated by encrypting the at least information usable to identify the first set of information using a private key portion of an asynchronous encryption key pair used by the verification computer system;

initiate addition of the information usable to identify the first set of information and the digital signature to a distributed digital ledger;

receive confirmation of the addition of the information usable to identify the first set of information and the digital signature to the distributed digital ledger; and report that the diamond material has been verified responsive to receipt of the confirmation.

20. The system of claim 19, wherein the information usable to identify the first set of information is the first set of information.

21. The system of claim 20, wherein the hundreds of values for channels of the spectrum of electromagnetic radiation comprise at least forty thousand channels of data from the spectrum of electromagnetic radiation.

22. The system of claim 20, wherein the hundreds of values for channels of the spectrum of electromagnetic radiation comprise at least three hundred channels of data from the spectrum of electromagnetic radiation.

23. The system of claim 20, wherein the hundreds of values for channels of the spectrum of electromagnetic radiation are indicative of isotopic emissions, molecular emissions, molecular structure, molecular isotopic emissions, spectral interference between atomic emissions from different atoms in the diamond material, or a combination thereof.

24. The system of claim 20, wherein the one or more computers are part of an analysis system, wherein a number of the channels of the spectrum used to verify an identity or provenance of the diamond material is application-specific, wherein the digital signature is a first digital signature, and wherein the one or more computers are operable to:

obtain the first set of information by being operable to irradiate the diamond material, receive the spectrum of electromagnetic radiation responsive to the irradiation, and generate the hundreds of values from the received spectrum of electromagnetic radiation;

obtain the second set of information by being operable to retrieve from the distributed digital ledger (a) previously produced hundreds of values for channels of the spectrum of electromagnetic radiation emitted by the diamond material in response to a previous irradiation of the diamond material and (b) a second digital signature of at least the previously produced hundreds of values, and verify the second digital signature using a public key portion of the asynchronous encryption key pair used by the verification computer system; and send the first and second sets of information by being operable to send the generated hundreds of values and the previously produced hundreds of values to the verification computer system.

25. The system of claim 24, wherein the light source with distinct spectral lines comprises a mercury lamp, and the one or more computers are operable to:

verify the first digital signature using the public key portion of the asynchronous encryption key pair used by the verification computer system;

check that one or more conditions of a transfer are met in addition to the verification of the first digital signature; and initiate payment for the transfer responsive to the check.

26. The system of claim 25, wherein the one or more computers are operable to identify the one or more conditions of the transfer from a record in the distributed digital ledger associated with the second set of information, and wherein the one or more computers are operable to initiate payment for the transfer by being operable to initiate the addition to the distributed digital ledger.

27. The system of claim 20, wherein:

the distributed digital ledger comprises a public distributed digital ledger and a private distributed digital ledger, the private distributed digital ledger comprising a first entry comprising the hundreds of values for channels of the spectrum of electromagnetic radiation;

the one or more computers are operable to obtain the second set of information regarding the diamond material to be verified by being operable to obtain, from the public distributed digital ledger, the second set of information comprising a second pointer to a second entry of the private distributed digital ledger regarding the physical diamond material to be verified;

the digital signature of the information usable to identify the first set of information comprises a digital signature of a first pointer to the first entry of the private distributed digital ledger; and the one or more computers are operable to initiate addition of the information usable to identify the first set of information and the digital signature to the distributed digital ledger by being operable to initiate addition of the first pointer to the public distributed digital ledger.

28. The system of claim 20, wherein:

the distributed digital ledger comprises a public portion and a private portion, the public portion comprising plain-text information and the private portion comprising encrypted information; and the first set of information is stored in the private portion of the distributed digital ledger, and the digital signature is stored in the public portion of the distributed digital ledger.

29. The system of claim 20, wherein the one or more computers are part of a tracking system, wherein the digital signature is a first digital signature, wherein the one or more computers are operable to obtain the first set of information by being operable to receive the hundreds of values, wherein the one or more computers are operable to obtain the second set of information by being operable to identify a current set of criteria for the diamond material at a current location in a supply chain, wherein the one or more computers are operable to send the first and second sets of information by being operable to send the hundreds of values and the current set of criteria for the diamond material at the current location in the supply chain, and wherein the one or more computers are operable to:

verify the first digital signature using a public key portion of the asynchronous encryption key pair used by the verification computer system;

retrieve from the distributed digital ledger (a) previously produced hundreds of values for channels of the spectrum of electromagnetic radiation emitted by the diamond material in response to a previous irradiation of the diamond material at a previous location in the supply chain and (b) a second digital signature of at least the previously produced hundreds of values, the second digital signature having been created to verify the diamond material at the previous location in the supply chain;

verify the second digital signature using the public key portion of the asynchronous encryption key pair used by the verification computer system; and initiate the addition to the distributed digital ledger only after verification of both the first digital signature and the second digital signature.

30. The system of claim 19, wherein the information usable to identify the first set of information is a first pointer to a first entry comprising the hundreds of values for channels of the spectrum of electromagnetic radiation, and wherein:

a private material information database comprises the first entry comprising the first set of information;

the one or more computers are operable to obtain the second set of information regarding the diamond material to be verified by being operable to obtain, from the distributed digital ledger, the second set of information comprising a second pointer to a second entry of the private material information database regarding to the diamond material to be verified;

the digital signature of the information usable to identify the first set of information comprises a digital signature of a first pointer to the first entry of the private material information database; and the one or more computers are operable to initiate addition of the information usable to identify the first set of information and the digital signature to the distributed digital ledger by being operable to initiate addition of the first pointer to the distributed ledger.

31. The system of claim 30, wherein the private material information database is a private distributed digital ledger.

32. The system of claim 19, wherein the information usable to identify the first set of information is a hash of the first set of information.

33. The non-transitory computer-readable medium of claim 18, wherein the hundreds of values for channels of the spectrum of electromagnetic radiation comprise at least forty thousand channels of data from the spectrum of electromagnetic radiation.

34. The system of claim 29, wherein the diamond material at the previous location in the supply chain is an uncombined raw material, and the diamond material at the current location in the supply chain is combined with at least one other physical material.

35. The non-transitory computer-readable medium of claim 18, wherein the hundreds of values for channels of the spectrum of electromagnetic radiation comprise at least three hundred channels of data from the spectrum of electromagnetic radiation.

36. The non-transitory computer-readable medium of claim 18, wherein the hundreds of values for channels of the spectrum of electromagnetic radiation are indicative of isotopic emissions, molecular emissions, molecular structure, molecular isotopic emissions, spectral interference between atomic emissions from different atoms in the diamond material, or a combination thereof.

37. The non-transitory computer-readable medium of claim 18, wherein the data processing apparatus is part of an analysis system, wherein a number of the channels of the spectrum used to verify an identity or provenance of the diamond material is application-specific, wherein the digital signature is a first digital signature, and wherein:

obtaining the first set of information comprises irradiating the diamond material, receiving the spectrum of electromagnetic radiation responsive to the irradiating, and generating the hundreds of values from the received spectrum of electromagnetic radiation;

obtaining the second set of information comprises retrieving from the distributed digital ledger (a) previously produced hundreds of values for channels of the spectrum of electromagnetic radiation emitted by the diamond material in response to a previous irradiation of the diamond material and (b) a second digital signature of at least the previously produced hundreds of values, and verifying the second digital signature using a public key portion of the asynchronous encryption key pair used by the verification computer system; and sending the first and second sets of information comprises sending the generated hundreds of values and the previously produced hundreds of values to the verification computer system.

38. The non-transitory computer-readable medium of claim 37, wherein the light source with distinct spectral lines comprises a mercury lamp, the operations comprising:

verifying the first digital signature using the public key portion of the asynchronous encryption key pair used by the verification computer system;

checking that one or more conditions of a transfer are met in addition to the verification of the first digital signature; and initiating payment for the transfer responsive to the checking.

39. The non-transitory computer-readable medium of claim 38, the operations comprising identifying the one or more conditions of the transfer from a record in the distributed digital ledger associated with the second set of information, and wherein initiating payment for the transfer comprises initiating the addition to the distributed digital ledger.

40. The non-transitory computer-readable medium of claim 18, wherein:

the distributed digital ledger comprises a public distributed digital ledger and a private distributed digital ledger, the private distributed digital ledger comprising a first entry comprising the hundreds of values for channels of the spectrum of electromagnetic radiation;

obtaining the second set of information regarding the diamond material to be verified comprises obtaining, from the public distributed digital ledger, the second set of information comprising a second pointer to a second entry of the private distributed digital ledger regarding the diamond material to be verified;

the digital signature of the information usable to identify the first set of information comprises a digital signature of a first pointer to the first entry of the private distributed digital ledger; and initiating addition of the information usable to identify the first set of information and the digital signature to the distributed digital ledger comprises initiating addition of the first pointer to the public distributed digital ledger.

41. The non-transitory computer-readable medium of claim 18, wherein:
the distributed digital ledger comprises a public portion and a private portion, the public portion comprising plain-text information and the private portion comprising encrypted information; and
the first set of information is stored in the private portion of the distributed digital ledger, and the digital signature is stored in the public portion of the distributed digital ledger.

42. The non-transitory computer-readable medium of claim 18, wherein the data processing apparatus is part of a tracking system, wherein the digital signature is a first digital signature, wherein obtaining the first set of information comprises receiving the hundreds of values, wherein obtaining the second set of information comprises identifying a current set of criteria for the diamond material at a current location in a supply chain, wherein sending the first and second sets of information comprises sending the hundreds of values and the current set of criteria for the diamond material at the current location in the supply chain, and wherein the operations comprise:
verifying the first digital signature using a public key portion of the asynchronous encryption key pair used by the verification computer system;
retrieving from the distributed digital ledger (a) previously produced hundreds of values for channels of the spectrum of electromagnetic radiation emitted by the diamond material in response to a previous irradiation of the diamond material at a previous location in the supply chain and (b) a second digital signature of at least the previously produced hundreds of values, the second digital signature having been created to verify the diamond material at the previous location in the supply chain;
verifying the second digital signature using the public key portion of the asynchronous encryption key pair used by the verification computer system; and
initiating the addition to the distributed digital ledger only after verification of both the first digital signature and the second digital signature.

43. The non-transitory computer-readable medium of claim 42, wherein the diamond material at the previous location in the supply chain is an uncombined raw material, and the diamond material at the current location in the supply chain is combined with at least one other physical material.

44. The non-transitory computer-readable medium of claim 17, wherein the information usable to identify the first set of information is a first pointer to a first entry comprising the hundreds of values for channels of the spectrum of electromagnetic radiation.

45. The non-transitory computer-readable medium of claim 44, wherein:
a private material information database comprises the first entry comprising the first set of information;
obtaining the second set of information regarding the diamond material to be verified comprises obtaining, from the distributed digital ledger, the second set of information comprising a second pointer to a second entry of the private material information database regarding to the diamond material to be verified;
the digital signature of the information usable to identify the first set of information comprises a digital signature of a first pointer to the first entry of the private material information database; and
initiating addition of the information usable to identify the first set of information and the digital signature to the distributed digital ledger comprises initiating addition of the first pointer to the distributed ledger.

46. The non-transitory computer-readable medium of claim 45, wherein the private material information database is a private distributed digital ledger.

47. The non-transitory computer-readable medium of claim 17, wherein the information usable to identify the first set of information is a hash of the first set of information.

\* \* \* \* \*

UNITED STATES PATENT AND TRADEMARK OFFICE
CERTIFICATE OF CORRECTION

Page 1 of 1

PATENT NO. : 11,946,870 B2
APPLICATION NO. : 16/616047
DATED : April 2, 2024
INVENTOR(S) : Catherine E. McManus and James W. Dowe, III It is certified that error appears in the above-identified patent and that said Letters Patent is hereby corrected as shown below:

In the Claims

<u>Column 31</u>
Lines 9-10, in Claim 19, after "the" delete "physical"

<u>Column 32</u>
Line 38, in Claim 27, after "the" delete "physical"

Signed and Sealed this
Ninth Day of July, 2024

Katherine Kelly Vidal
*Director of the United States Patent and Trademark Office*